US009718475B2

(12) United States Patent
Fairgrieve et al.

(10) Patent No.: US 9,718,475 B2
(45) Date of Patent: Aug. 1, 2017

(54) TERRAIN-BASED VEHICLE SPEED CONTROL AND SYSTEM

(71) Applicant: Jaguar Land Rover Limited, Whitley Coventry Warwickshire (GB)

(72) Inventors: Andrew Fairgrieve, Rugby (GB); Elliot Hemes, Solihull (GB); Dan Dennehy, Coventry (GB); James Kelly, Solihull (GB); Sam Anker, Coventry (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 77 days.

(21) Appl. No.: 14/425,022

(22) PCT Filed: Sep. 6, 2013

(86) PCT No.: PCT/EP2013/068520
§ 371 (c)(1),
(2) Date: Feb. 28, 2015

(87) PCT Pub. No.: WO2014/037536
PCT Pub. Date: Mar. 13, 2014

(65) Prior Publication Data
US 2015/0224989 A1    Aug. 13, 2015

(30) Foreign Application Priority Data

Sep. 6, 2012    (GB) .................... 1215963.8

(51) Int. Cl.
*B60W 30/14* (2006.01)
*B60W 50/08* (2012.01)
(Continued)

(52) U.S. Cl.
CPC ......... *B60W 30/182* (2013.01); *B60G 17/015* (2013.01); *B60G 17/0165* (2013.01);
(Continued)

(58) Field of Classification Search
CPC .................................................. B60W 30/182
See application file for complete search history.

(56) References Cited

U.S. PATENT DOCUMENTS 4,987,966 A    1/1991    Fujita
5,711,712 A    1/1998    Graf
(Continued)

FOREIGN PATENT DOCUMENTS

CN    101885331 A    11/2010
GB    2403027 A    12/2004
(Continued)

OTHER PUBLICATIONS

Japanese Notice of Reasons for Refusal, in Japanese with English summary, dated May 10, 2016, 8 pages.
(Continued)

*Primary Examiner* — Todd Melton
(74) *Attorney, Agent, or Firm* — Reising Ethington P.C.

(57) ABSTRACT

Embodiments of the present invention provide a control system for a motor vehicle, the system being operable in an automatic mode selection condition in which the system is configured to select automatically an appropriate system operating mode whereby the system assumes operation in said system operating mode, the system being further configured to allow activation of an automatic progress control function in which a speed of the vehicle over terrain is controlled automatically by the system, wherein when the automatic progress control function is active the system is configured automatically to suspend changes in the selected system operating mode.

16 Claims, 7 Drawing Sheets

(51) Int. Cl.
*B60T 7/12* (2006.01)
*B62D 15/02* (2006.01)
*B60W 30/182* (2012.01)
*B60W 10/18* (2012.01)
*B60W 10/20* (2006.01)
*B60W 10/22* (2006.01)
*B60G 17/0165* (2006.01)
*B60G 17/0195* (2006.01)
*B60W 10/06* (2006.01)
*B60W 10/11* (2012.01)
*B60W 30/02* (2012.01)
*B60W 30/18* (2012.01)
*B60G 17/015* (2006.01)
*B60W 50/14* (2012.01)
*B62D 6/00* (2006.01)
*F02D 29/02* (2006.01)
*F16H 59/66* (2006.01)
*B60W 50/00* (2006.01)

(52) U.S. Cl.
CPC .......... *B60G 17/0195* (2013.01); *B60T 7/12* (2013.01); *B60W 10/06* (2013.01); *B60W 10/11* (2013.01); *B60W 10/18* (2013.01); *B60W 10/20* (2013.01); *B60W 10/22* (2013.01); *B60W 30/02* (2013.01); *B60W 30/14* (2013.01); *B60W 30/18* (2013.01); *B60W 50/08* (2013.01); *B60W 50/082* (2013.01); *B60W 50/087* (2013.01); *B60W 50/14* (2013.01); *B62D 6/00* (2013.01); *B62D 15/02* (2013.01); *F02D 29/02* (2013.01); *F16H 59/66* (2013.01); *B60W 2050/0074* (2013.01); *B60W 2050/0082* (2013.01); *B60W 2050/0089* (2013.01); *B60W 2050/0095* (2013.01); *B60W 2510/101* (2013.01); *B60W 2540/06* (2013.01); *B60W 2540/16* (2013.01); *B60W 2540/165* (2013.01); *B60W 2720/30* (2013.01)

(56) References Cited

U.S. PATENT DOCUMENTS

| | | | |
|---|---|---|---|
| 7,162,346 B2 * | 1/2007 | Berry | B60W 10/06 701/1 |
| 7,263,419 B2 * | 8/2007 | Wheals | B60T 8/172 701/36 |
| 7,577,508 B2 * | 8/2009 | Fitzgibbons | B60G 17/0195 701/70 |
| 8,328,690 B2 | 12/2012 | Ohtsu | |
| 8,452,504 B2 * | 5/2013 | Dickinson | F16H 48/32 180/65.28 |
| 2003/0200016 A1 | 10/2003 | Spillane et al. | |
| 2010/0292894 A1 | 11/2010 | Essaili et al. | |
| 2012/0253628 A1 | 10/2012 | Maruyama | |

FOREIGN PATENT DOCUMENTS

| | | |
|---|---|---|
| GB | 2492896 A | 1/2013 |
| JP | H04203557 A | 7/1992 |
| JP | H06270713 A | 9/1994 |
| JP | H09240447 A | 9/1997 |
| JP | 2003525156 A | 8/2003 |
| JP | 2010018147 A | 1/2010 |
| JP | 2012111263 A | 6/2012 |

OTHER PUBLICATIONS

International Search Report for application No. PCT/EP2013/068520, dated Jan. 3, 2014, 6 pages.
UK Combined Search and Examination Report for corresponding application No. 1315961.1, dated Apr. 3, 2014, 8 pages.
Written Opinion for application No. PCT/EP2013/068520, dated Jan. 3, 2014, 7 pages.
Chinese Office Action in Chinese with English translation for CN application No. 201380058041.X, dated Sep. 2, 2016, 19 pages.
Japanese Office Action in Japanese with English translation for JP application No. 2015-530421, dated Jan. 24, 2017.

\* cited by examiner

| SP = Speed Proportional<br>TM = Towing Mode | | Motorway | Country Road | City Driving | Towing (on Road) | Dirt Track (Developing World Road) | Snow / Ice (Scandinavian / North America Conditions) | Grass/ gravel/ snow | Sand | Rock/ Crawl/ Boulder Crossing | Mud & ruts |
|---|---|---|---|---|---|---|---|---|---|---|---|
| Suspension Ride Height | High | | | | | | | | | X | |
| | Standard | | X | X | X | X | X | X | X | | X |
| | Low | X | | | | | | | | | |
| Side / Side Air Interconnection | Closed | X | X | X | X | X | X | X | X | X | X |
| | Open | | | | | | | | | | |
| Steering Assistance Level | High | SP | SP | SP | SP | SP | SP | SP | SP | | SP |
| | Low | | | | | | | | | | |
| Brake Pedal Efforts | High | X | X | X | X | X | X | X | X | X | X |
| | Low | | (X) | X | X | | | | | | |
| A.B.S. Mode | High mu | X | X | X | | | | | | | |
| | Low mu | | | | | X | X | X | X | | X |
| | Plough Surface | | | | | | | | | | |
| E.T.C. Mode | High mu | X (2) | X | X | X | | | | | X | |
| | Low mu | | | | | X | X | X | | X | X |
| D.S.C. Mode | High mu | X | X | X | TM | X | X | X | X | X | X |
| | Low mu | | | | | | | | | | |
| Throttle Progression | Quick | | (X) | X | (X) | X | X | X | X | | X |
| | Slow | X | X | X | X | X | X | X | X | X | X |
| Transfer Box | High Range | X | X | X | X | X | X | X | X | X | X |
| | Low Range | | | | | | | | | | |
| Auto Transmission | Normal Mode | X | | X | X | X | X | | | | |
| | Performance Mode | | X | | | | | | | | |
| | Snow Mode | | | | | | | X | | | X |
| | Sand Mode | | | | | | | | X | | |
| | Manual Mode | | (X) | | | | | | | X | X |
| Centre Diff Lock | Open | X | X | X | X | X | X | | | | |
| | Locked | | | | | | | X | X | X | X |
| Rear Diff Lock | Open | X | X | X | X | X | X | X | (X) | X | X |
| | Locked | | | | | | | | | X | X |

FIGURE 3

TERRAIN-BASED VEHICLE SPEED CONTROL AND SYSTEM

INCORPORATION BY REFERENCE

The entire contents of co-pending UK patent application numbers GB1111288.5, GB1211910.3 and GB1202427.9 and UK patents GB2325716, GB2308415, GB2341430, GB2382158 and GB2381597 are expressly incorporated herein by reference.

FIELD OF THE INVENTION

The present invention relates to a vehicle control system for one or more vehicle subsystems and to a method of controlling one or more vehicle subsystems.

BACKGROUND

It is known to provide a vehicle having a plurality of subsystems which can be operated in different configurations to suit different driving conditions. For example, automatic transmissions may be controlled in a variety of modes such as sport, manual, winter or economy. In each mode, subsystem control parameters such as accelerator pedal response and conditions under which changes between gear ratios take place may be modified so as to suit the conditions of the terrain or the particular taste of the driver. It is also known to provide air suspensions with on-read and off-read modes. Stability control systems can be operated at reduced activity in certain modes so as to give the driver more direct control, and power steering systems can be operated in different modes to provide a varying level of assistance depending on driving conditions.

It is desirable to provide an improved control system for a motor vehicle operable in different configurations.

STATEMENT OF THE INVENTION

Embodiments of the invention may be understood with reference to the appended claims.

Aspects of the present invention provide a control system, a vehicle and a method.

Control systems according to embodiments of the present invention are suitable for a range of different vehicles including conventional engine-only vehicles, electric vehicles, and/or hybrid electric vehicles.

According to an aspect of the invention for which protection is sought there is provided a control system for a motor vehicle, the system being operable in an automatic mode selection condition in which the system is operable to select automatically an appropriate system operating mode. The system is further operable to activate and/or arm an automatic progress control function by which a speed of the vehicle over terrain is controlled automatically by the system in dependence on activation of the automatic mode selection condition.

In a further aspect of the invention for which protection is sought there is provided a control system for a motor vehicle, the system being operable in an automatic mode selection condition in which the system is configured to select automatically an appropriate system operating mode, the system being further operable to activate and/or arm an automatic progress control function by which a speed of the vehicle over terrain may be controlled automatically by the system in dependence on the operating condition of the vehicle, wherein when the automatic progress control function is actively controlling the speed of the vehicle, the system is configured automatically to suspend automatic changes in the selected system operating mode.

In the above aspect, but not essentially, a distinction is made between activating or arming the automatic progress control function and triggering the automatic progress control function so as to begin controlling the vehicle speed over ground, the latter of which may commence only in dependence on certain operating conditions of the vehicle being met, for example movement below a predetermined speed and/or on an incline having a predetermined minimum gradient.

In an embodiment, the system may be operable to select and/or determine a driving surface and to control a plurality of vehicle subsystems to operate in a plurality of subsystem configuration modes in dependence on the selected/determined driving surface.

One of the subsystems may comprise a differential system operable to provide a plurality of levels of differential lock, and the subsystem configuration modes may be arranged to provide different levels of said lock.

The differential system may be arranged to control the level of differential lock on the basis of a plurality of inputs, and to respond differently to said inputs in each of the modes.

The differential system may comprise a centre differential, a front differential and/or a rear differential. The differential may be a clutch-based system in some embodiments, whereby differences in rates of rotation of wheels is accommodated by slipping of a clutch rather than by means of a conventional differential gear arrangement in which side wheels are coupled via pinion wheels supported by a differential cage in order to allow relative rotation.

One of the subsystems may comprise a roll control system arranged to provide roll correction to reduce vehicle roll and the subsystem configuration modes provide different levels of roll correction of the vehicle, at least under some driving conditions.

One of the subsystems may comprise a speed control system arranged to control the speed of the vehicle when descending a hill. The speed control system may be arranged to control the vehicle to different speeds in the different configuration modes.

Optionally, the operating modes may include an off-road mode in which the subsystems are controlled in a manner suitable for driving on rough terrain and an on-road mode in which the subsystems are controlled in a manner suitable for driving on-road.

Optionally the suspension system is arranged to provide a higher ride height in the off road mode than in the on-road mode.

Further optionally, in the off-road mode a higher level of said interconnection is provided than in the on-road mode.

The traction control system may be arranged to allow less wheel spin in the off-road mode than in the on-road mode.

Optionally the yaw control system is arranged to allow a higher degree of said divergence in the off-road mode than in the on-read mode.

Optionally, in the off-road mode the range change, transmission is operated in the low range.

Optionally, in the off-road mode the powertrain control means is arranged to provide lower levels of drive torque, for a given accelerator or throttle pedal position, at least at low levels of accelerator pedal depression, than in the on-road mode.

Optionally, the differential system is arranged to provide higher levels of differential lock in the off-road mode than in the on-road mode.

Optionally, the roll control system is arranged to provide a higher roll stiffness in the on-road mode than in the off-road mode.

Optionally, the speed control system is arranged to be switched on in the off-road mode and switched off in the on-road mode.

Optionally, the driving modes include at least one low friction mode in which the subsystems are controlled in a manner suitable for driving on low friction surfaces and a high friction mode in which the subsystems are controlled in a manner suitable for driving on high friction surfaces.

Optionally, the brake control system allows higher levels of slip in the high friction mode than in the low friction mode.

Optionally, the traction control-system allows higher levels of wheel spin in the high friction mode than in the low friction mode.

Optionally, the braking control system provides a greater level of braking assistance in the high friction mode than in the low friction mode.

Optionally, the powertrain control means is arranged to provide lower levels of drive torque, for a given accelerator or throttle pedal position, at least at low levels of accelerator pedal depression, in the low friction mode than in the high friction mode.

Optionally, the transmission system is arranged to operate in higher gears for a given value of said at least one parameter in the high friction mode than in the low friction mode.

Optionally, the differential system is arranged to provide higher levels of differential lock in the low friction mode then in the high friction mode.

Optionally, the high friction mode may comprise a standard or default mode in which the vehicle will operate normally and which is suitable for on-road driving.

Optionally, there are at least two such low friction modes and the suspension system is arranged to provide a higher ride height in one of the low friction modes than in the other.

Further optionally, there are at least two such low friction modes and the suspension system is arranged to provide a higher level of said cross linking in one of the low friction modes than in the other.

Optionally, the at least two low friction modes may comprise a mud mode suitable for traveling through deep mud, and another low friction mode suitable for driving in snow, on grass, or on gravel.

Optionally there may be a plurality of low friction modes, one of which may be a grass mode in which the subsystems are controlled in a manner suitable for driving on grass, one of which may be an ice mode in which the subsystems are controlled in a manner suitable for driving in ice, and one of which may be a mud mode in which the subsystems are controlled in a manner suitable for driving on mud.

Optionally one of the modes is a sand mode in which tire subsystems are controlled in a manner suitable for driving on sand. At least one of the subsystems may be arranged, in the sand mode, to allow only relatively low levels of wheel spin when the vehicle is traveling at low speeds so as to avoid the vehicle wheels becoming submerged in sand, but to allow relatively high levels of wheel spin when the vehicle is traveling at higher speeds. Optionally, in the sand mode, the powertrain control system is arranged to provide relatively low levels of drive torque for a given throttle pedal position at low vehicle speeds and to provide relatively high levels of drive torque for a given throttle pedal position at higher vehicle speeds.

The off-road mode may be a rock crawl mode in which the subsystems are controlled in a manner suitable for driving over rocks. Alternatively it may be set up for more general off-road use. One or more other off-road modes may be provided in addition or instead.

One of the modes may be a rough-road mode in which the subsystems are controlled in a manner suitable for driving on rough roads, for example for driving at relatively high speeds over rough surfaces.

At least one of the modes may be a plough surface mode in which the brake control subsystem is arranged to allow a relatively high degree of wheel slip under braking. This may be useful, for example on snow or sand, where the build-up of matter in front of the wheels under braking can improve braking performance.

Optionally, at least one of the modes is an on-road mode in which the subsystems are controlled in a manner suitable for driving on-road. For example, one of the modes may be a motorway mode in which the subsystems are controlled in a manner suitable for driving at high speed on a flat road surface. One of the modes may be a country road mode in which the subsystems are controlled in a manner suitable for driving on country roads.

The driving modes may be selectable by means of at least two inputs, one of which may be a terrain selection input arranged to influence the mode selected on the basis of the terrain selected, and the other of which may be a mode of use input arranged to influence the mode selected on the basis of a selected mode of use of the vehicle. Each of these inputs may be user-controlled inputs, or may be derived from one or more sensors.

The mode of use input may be arranged to allow selection between a plurality of driving styles, which may include, for example, a normal style, a sport style, and an economy style.

Alternatively, or in addition, the mode of use input may be arranged to allow selection between a plurality of states of the vehicle, for example including a towing state or a loaded state.

In an embodiment, the automatic progress control function may comprise a hill descent control (HDC) function. HDC may apply a retarding torque to the wheels of the vehicle to prevent uncontrolled vehicle acceleration above a HDC target speed as a result of the gravitational forces acting on the vehicle.

Embodiments of the invention have the advantage that if the automatic progress control function is subsequently deactivated, the control system behaviour will be substantially as expected by a user because the system has remained in the same operating mode in which if operated prior to activation of the automatic progress control function. In contrast, if the system had been permitted to change operating mode whilst under the control of the automatic progress control function, when the automatic progress control function is deactivated the user may be inconvenienced by the change in behaviour of the control system relative to that experienced by the user prior to selection of the automatic progress control function, which may be a hill descant control (HDC) function.

For example the user may not be expecting a change, and that the fact that a change takes place may result in a reduction in user confidence. Vehicle composure may be reduced during the period following deactivation of the automatic progress control function whilst the user gains familiarity with the changed system behaviour.

It is to be understood that the system may be operable to activate the automatic progress control function in response to a user command, for example by means of user input means, for example by means of a selector button, knob, touchscreen or other user input means. In some embodiments the system may be operable automatically to activate the automatic progress control function in addition or instead.

It is to be understood that whilst the system is selecting automatically an appropriate system operating mode, the fact that the automatic progress control function is active may result in the system selecting a sub-optimum mode due to activity of the automatic progress control function. By suspending changes in operating mode whilst the automatic progress control function is active the likelihood of a sub-optimum control mode (system operating mode) being selected is reduced. For example, repeated application of a braking system, as may be expected when HDC is operational may induce changes in pitch and/or roll angle which may be detected by the vehicle and attributed to terrain variations rather than to actuation of the braking system by the automatic progress control function.

Advantageously, when the automatic progress control function is deactivated the system may be operable to continue to suspend changes in the selected system operating mode for a prescribed period of time or a prescribed distance of travel.

This feature has the advantage that the system may be given time or a distance of travel in which to determine an appropriate operating mode once the automatic progress control function has been deactivated.

This feature also has the advantage that in some embodiments a user may be given time to regain familiarity with system behaviour whilst controlling vehicle progress now that the automatic progress control function is no longer active, before any change in operating mode is made automatically.

In some embodiments the system may be operable to continue to determine the most appropriate control mode even when changes ere suspended.

The system may be further operable in a manual operating mode selection condition in which a user may select a required system operating mode by means of user-operable mode selection input means, the system being operable to allow a user to select the required operating condition by means of a user operable condition selection input means, the system being configured to assume the user selected operating mode in response to user selection by means of the user operable condition selection input means.

Thus when the user selects by means of the user-operable mode selection input means operation of the system in an operating mode other than that in which the system is currently operating, the system selects (assumes) the newly selected operating mode.

Optionally, when operating in the manual operating mode selection condition with the automatic progress control function activated the system is operable to allow a change in selected operating mode when the user-operable mode selection input means indicates a user requires a change in operating mode.

Thus when the user selects by means of the user-operable mode selection input means operation of the system in an operating mode other than that in which the system is currently operating, the system assumes the newly selected operating mode even if the automatic progress control function is active.

Advantageously the operating modes may be control modes of at least one vehicle subsystem of a vehicle, the system comprising a subsystem controller for initiating control of the or each of the vehicle subsystems in the selected one of the plurality of subsystem control modes, each of which corresponds to one or more different driving conditions for the vehicle.

The system may comprise evaluation means for evaluating one or more driving condition indicators to determine the extent to which each of the subsystem control modes is appropriate, wherein when in the automatic condition the system is operable automatically to control the subsystem controller to initiate control of the or each subsystem in the subsystem control mode which is most appropriate.

The automatic progress control function may be operable to control the vehicle to maintain a substantially constant speed when descending an incline.

The automatic progress control function may implement a hill descent control (HDC) function. HDC functionality is described in UK patents GB2325716, GB2308415, GB2341430, GB2382158 and GB2381597 the content of each of which is incorporated herein by reference. The automatic progress control function may be operable to control the vehicle to maintain the substantially constant speed when descending the incline by means of a foundation braking system. In some embodiments powertrain braking (for example engine braking) may be employed in addition or instead.

The system may be operable to activate the automatic progress control function in response to a user command to activate the automatic progress control function.

Thus, the system operating modes may each correspond to one of a plurality of different driving surfaces. In each system operating mode each subsystem may be operated in the subsystem configuration mode appropriate to the driving condition or driving surface.

Various possible known subsystem configuration modes will now be described. The reader is referred to US2003/0200016 for further details in respect of known implementations of the subsystem configuration modes.

Optionally, the operating modes are control modes of at least one vehicle subsystem of a vehicle, the system comprising a subsystem controller for initiating control of the or each of the vehicle subsystems in the selected one of the plurality of subsystem control modes, each of which corresponds to one or more different driving conditions for the vehicle.

The system may comprise evaluation means for evaluating one or more driving condition indicators to determine the extent to which each of the subsystem control modes is appropriate.

wherein when in the automatic condition the system is operable automatically to control the subsystem controller to initiate control of the or each subsystem in the subsystem control mode which is most appropriate.

The operating modes may be control modes of at least one vehicle subsystem selected from amongst an engine management system, a transmission system, a steering system, a brakes system and a suspension system.

The operating modes may be control modes of at least two vehicle subsystems selected from amongst an engine management system, a transmission system, a steering system, a brakes system and a suspension system.

The operating modes may be control modes of each of these systems.

Optionally the system comprises evaluation means for evaluating one or more driving condition indicators to determine the extent to which each of the subsystem control modes is appropriate.

Optionally, when in the automatic condition the system is operable automatically to control the subsystem controller to initiate control of the or each subsystem in the subsystem control mode which is most appropriate.

Thus, the system operating modes may each correspond to one of a plurality of different driving conditions.

The operating modes may be control modes of at least one vehicle subsystem selected from amongst an engine management system, a transmission system, a steering system, a brakes system and a suspension system.

Optionally, the operating modes are control modes of at least two vehicle subsystems selected from amongst an engine management system, a transmission system, a steering system, a brakes system and a suspension system.

The operating modes may be control modes of each of these systems.

Optionally, in each system operating mode the system is operable to cause each one of a plurality of vehicle subsystems to be operated in a subsystem configuration mode appropriate to the driving condition.

For example, in the case of a vehicle sub-system in the form of a suspension system operable at a plurality of different ride-heights for a given vehicle loading, the subsystem configuration modes may include modes corresponding to different respective ride heights. In the case of a vehicle sub-system controller in the form of an engine or powertrain controller, the controller may be operable to provide different respective values of engine torque as a function of accelerator pedal position in each of a plurality of different powertrain controller configuration modes. A subsystem control mode may therefore correspond to a set of subsystem configuration modes, for example one configuration mode for each subsystem. For example in one operating mode a 'high' ride height subsystem configuration mode may be set for the suspension system and a 'slow' accelerator pedal map subsystem configuration mode may be set for the powertrain controller. Some subsystems may allow two different parameters to be set. Thus the suspension system may allow a roll stiffness setting of the suspension to be set to one of a plurality of configuration modes such as low, medium or high.

Various possible known subsystem configuration modes will now be described. The reader is referred to US2003/0200016 for further details in respect of known types of subsystem configuration mode and the manner in which the configuration modes may be implemented. Other configuration modes are also useful. Other subsystems may also be controlled, in addition or instead.

Optionally, the operating modes include control modes of a suspension system and the plurality of subsystem configuration modes comprise a plurality of ride heights.

The operating modes may include control modes of a fluid suspension system in which fluid interconnection can be made between suspensions for wheels on opposite sides of the vehicle, and wherein said plurality of subsystem configuration modes provide different levels of said interconnection.

Optionally, the operating modes may include control modes of a steering system which can provide steering assistance, and wherein said plurality of subsystem configuration modes provide different levels of said steering assistance.

Optionally, the operating modes include control modes of a brakes system which can provide braking assistance, and said plurality of subsystem configuration modes provide different levels of said braking assistance.

Optionally, the operating modes include control modes of a brake control system which can provide an anti-lock function to control wheel slip, and said plurality of subsystem configuration modes allow different levels of said wheel slip.

Optionally, the operating modes include control modes of a traction control system which is arranged to control wheel spin, and said plurality of subsystem configuration modes allow different levels of said wheel spin.

Optionally, the operating modes include control modes of a yaw control system which is arranged to control vehicle yaw, and said plurality of subsystem configuration modes allow different levels of divergence of said vehicle yaw from an expected yaw.

Optionally, the operating modes include control modes of a range change transmission and said subsystem configuration modes may include a high range mode and a low range mode of said transmission.

The range change transmission may for example by comprised by a power transfer unit or power take-off unit for coupling a prop shaft of a driveline to a torque transmission path from an engine or transmission of the vehicle, such as an automatic transmission.

Optionally, the operating modes include control modes of a powertrain system which includes a powertrain control means and an accelerator or throttle pedal, the subsystem configuration modes providing different levels of responsiveness of the powertrain control means to movement of the accelerator or throttle pedal.

Optionally, the operating modes include control modes of a transmission system operable in a plurality of transmission ratios and including a transmission control means (such as an electronic transmission controller) arranged to monitor at least one parameter of the vehicle and to select the transmission ratios in response, and wherein the subsystem configuration modes include a plurality of transmission configuration modes in which the transmission ratios are selected differently in response to said at least one parameter.

In a further aspect of the invention for which protection is sought there is provided a vehicle comprising a system according to the preceding aspect.

The vehicle may be adapted for off-road driving.

In a further aspect of the invention for which protection is sought there is provided a method of controlling a vehicle system to operate in an automatic mode selection condition implemented by computing means, when the system is operating in the automatic mode selection condition the method comprising selecting automatically by computing means an appropriate system operating mode whereby the system assumes operation in the selected mode, the method further comprising activating an automatic progress control function and controlling automatically a speed of the vehicle over terrain in response to activation of the automatic progress control function, whereby when the automatic progress control function is active the method comprises automatically suspending automatic changes in the selected system operating mode.

Thus, automatic changes in the selected system operating mode are suspended automatically when automatic progress control functionality is active and the system is operating in the automatic mode selection condition.

In an aspect of the invention for which protection is sought there is provided a carrier medium carrying computer readable code for controlling a vehicle to carry out a method according to an aspect of the invention.

In a further aspect of the invention for which protection is sought there is provided a motor vehicle control system for selecting and/or determining a driving surface and for controlling a plurality of vehicle subsystems to operate in a plurality of subsystem configuration modes in dependence on the selected driving surface, the system being operable in a manual operating mode in which a user is able to select said driving surface and an automatic operating mode in which the system is operable to select/determine said driving surface automatically. When the system is operating in said automatic operating mode, the system may be operable to select an appropriate vehicle subsystem configuration mode and/or permit operation in one or more subsystem configuration mode(s) in dependence on the status of one or more vehicle subsystem(s) and/or one or more modes of vehicle operation. The system may select an appropriate vehicle subsystem configuration mode and/or permit operation in one or more subsystem configuration mode(s) by selecting an appropriate subsystem control mode or driving mode, which may be considered to be a system operating mode.

In an example, the motor vehicle control system operating in the automatic operating mode assumes operation of at least one vehicle subsystem and/or is arranged to limit or otherwise restrict use in one or more said subsystem configuration mode(s) in dependence on any parameter which may influence vehicle behaviour.

In an embodiment, the system is able to be switched between said manual and automatic operating modes by means of a user-operable input device; and wherein when operating in the automatic operating mode and a change from the automatic operating mode to the manual operating mode is made via the user-operable input device, the system is configured to select a default subsystem configuration mode. A default subsystem configuration mode may be selected for each subsystem where a plurality of subsystems are provided, or for only one or more of the plurality but not all. A default subsystem configuration mode may be selected for each subsystem by selecting a default subsystem control mode or system operating mode. In each system operating mode the vehicle subsystems may each be caused to operate in a subsystem configuration mode appropriate to the driving surface. In some embodiments one or more system operating modes may correspond to a particular mode of use. The modes of use may for example correspond to respective different driving styles, which may include, for example, a normal style, a sport style, and an economy style. Alternatively, modes of use may correspond to respective states of the vehicle, for example including a towing state or a loaded state.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which:

FIG. 3 is a table showing which vehicle subsystem configuration mode is selected in each respective vehicle operating mode;

DETAILED DESCRIPTION

Figure 1:
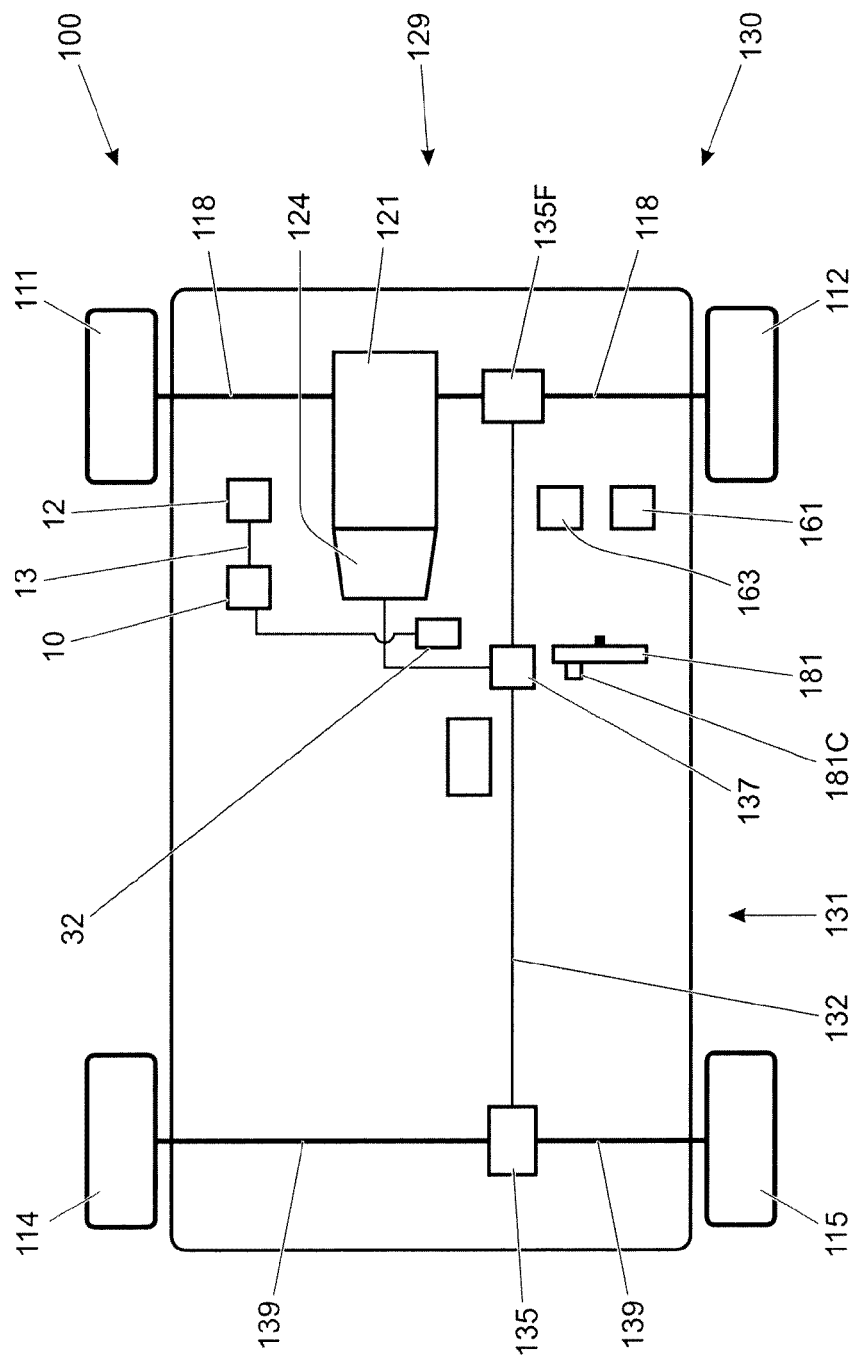
FIG. 1 is a schematic illustration of a vehicle according to an embodiment of the present invention.

FIG. 1 shows a vehicle 100 according to an embodiment of the invention intended to be suitable for off-road use, that is for use on terrains other than regular tarmac road, as well as on-road. The vehicle 100 has a powertrain 129 that includes an engine 121 that is connected to a driveline 130 having a transmission 124. In the embodiment shown the transmission 124 is an automatic transmission 124. Embodiments of the present invention are also suitable for use in vehicles with a manual transmission, continuously variable transmission or any other suitable transmission.

The driveline 130 is arranged to drive a pair of front vehicle wheels 111,112 by means of a front differential 135F and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 137, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

The PTU 137 is operable in a 'high ratio' or a 'low ratio' configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions and other low speed applications such as towing.

The vehicle 100 has an accelerator pedal 161, brake pedal 163 and steering wheel 181. The steering wheel 181 has a cruise control selector button 181C mounted thereto.

The vehicle 100 has a central controller, referred to as a vehicle control unit (VCU) 10. The VCU 10 receives and outputs a plurality of signals to and from various sensors and subsystems 12 provided on the vehicle 100.

Figure 2:
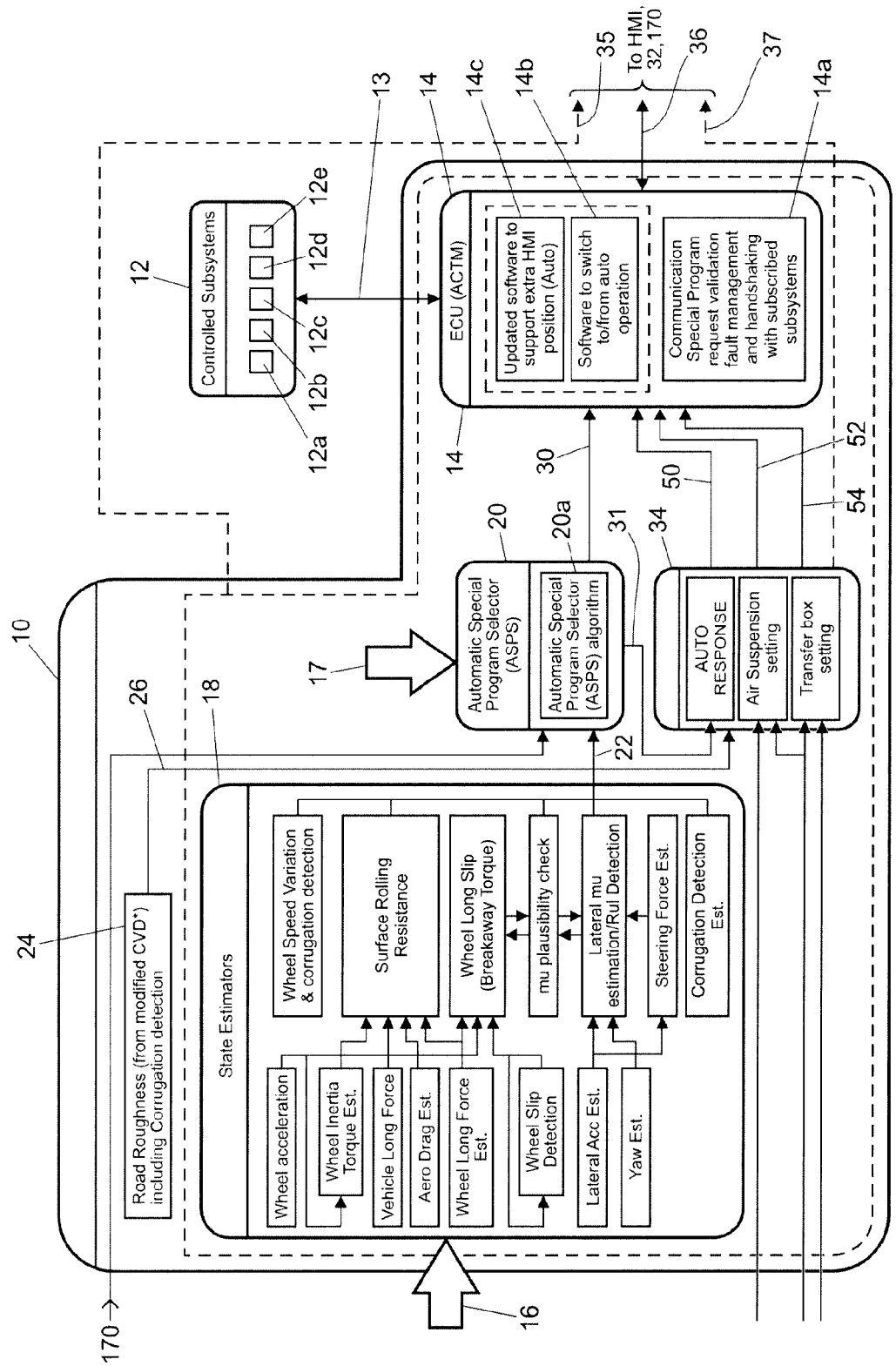
FIG. 2 is a block diagram to illustrate a vehicle control system in accordance with an embodiment of the invention, including various vehicle subsystems under the control of the vehicle control system.

FIG. 2 shows the VCU 10 in more detail. The VCU 10 controls a plurality of vehicle subsystems 12 including, but not limited to, an engine management system 12a, a transmission system 12b, an electronic power assisted steering unit 12c (ePAS unit), a brakes system 12d and a suspension system 12e. Although live subsystems are illustrated as being under the control of the VCU 10, in practice a greater number of vehicle subsystems may be included on the vehicle and may be under the control of the VCU 10. The VCU 10 includes a subsystem control module 14 which provides control signals via line 13 to each of the vehicle subsystems 12 to initiate control of the subsystems in a manner appropriate to the driving condition, such as the terrain, in which the vehicle is travelling (referred to as the terrain condition). The subsystems 12 also communicate with the subsystems control module 14 via signal line 13 to feedback information en subsystem status. In some embodiments, instead of an ePAS unit 12c, a hydraulically operated power steering unit may be provided.

The VCU 10 receives a plurality of signals, represented generally at 16 and 17, which are received from a plurality of vehicle sensors and are representative of a variety of different parameters associated with vehicle motion and status. As described in further detail below, the signals 16, 17 provide, or are used to calculate, a plurality of driving condition indicators (also referred to as terrain indicators) which are indicative of the nature of the condition in which the vehicle is travelling. One advantageous feature of some embodiments of the present invention is that the VCU 10 determines the most appropriate control mode for the various subsystems on the basis of the terrain indicators, and automatically controls the subsystems accordingly. That is, the VCU 10 determines the most appropriate control mode on the basis of the terrain indicators and automatically causes each of the subsystems 12 to operate in the respective subsystem configuration mode corresponding to that control mode.

The sensors (not shown) on the vehicle include, but are not limited to, sensors which provide continuous sensor outputs 16 to the VCU 10, including wheel speed sensors, an ambient temperature sensor, an atmospheric pressure sensor, tyre pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an acceleration pedal position sensor and longitudinal, lateral, vertical motion sensors.

In other embodiments, only a selection of the aforementioned sensors may be used. The VCU 10 also receives a signal from the electronic power assisted steering unit (ePAS unit 12c) of the vehicle to indicate the steering force that is applied to the wheels (steering force applied by the driver combined with steering force applied by the ePAS unit 12c).

The vehicle 100 is also provided with a plurality of sensors which provide discrete sensor output signals 17 to the VCU 10, including a cruise control status signal (ON/OFF), a transfer box or PTU 137 status signal (whether the gear ratio is set to a HI range or a LO range), a Hill Descent Control (HDC) status signal (ON/OFF), a trailer connect status signal (ON/OFF), a signal to indicate that the Stability Control System (SOS) has been activated (ON/OFF), a windscreen wiper signal (ON/OFF), an air-suspension ride-height status signal (HI/LO), and a Dynamic-Stability Control (DSC) signal (ON/OFF).

The VCU 10 includes an evaluation means in the form of an estimator module or processor 18 and a calculation and selection means in the form of a selector module or processor 20.

Initially the continuous outputs 16 from the sensors are provided to the estimator module 18 whereas the discrete signals 17 are provided to the selector module 20.

Within a first stage of the estimator module 18, various ones of the sensor outputs 16 are used to derive a number of terrain indicators. In a first stage of the estimator module 18, a vehicle speed is derived from the wheel speed sensors, wheel acceleration is derived from the wheel speed sensors, the longitudinal force on the wheels is derived from the vehicle longitudinal acceleration sensor, and the torque at which wheel slip occurs (if wheel slip occurs) is derived from the motion sensors to detect yaw, pitch and roll. Other calculations performed within the first stage of the estimator module 18 include the wheel inertia torque (the torque associated with accelerating or decelerating the rotating wheels), "continuity of progress" (the assessment of whether the vehicle is starting and stopping, for example as may be the case when the vehicle is travelling over rocky terrain), aerodynamic drag, yaw rate, and lateral vehicle acceleration.

The estimator module 18 also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel 181 (based on the lateral acceleration and the output from the steering wheel sensor), the wheel longitudinal slip (based on the longitudinal force on the wheels, the wheel acceleration, SCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface).

The SCS activity signal is derived from several outputs from an SCS ECU (not shown), which contains the DSC (Dynamic Stability Control) function, the TC (Traction Control) function, ABS and HDC algorithms, indicating DSC activity, TC activity, ABS activity, brake interventions on individual wheels, and engine torque reduction requests from the SCS ECU to the engine. All these indicate a slip event has occurred and the SCS ECU has taken action to control it. The estimator module 18 also uses the outputs from the wheel speed sensors to determine a wheel speed variation and corrugation detection signal.

On the basis of file windscreen wiper signal (ON/OFF), the estimator module 18 also calculates bow long the windscreen wipers have been in an ON state (i.e. a rain duration signal).

The VCU 10 also includes a road roughness module 24 for calculating the terrain roughness based on the air suspension sensors (the ride height sensors) and the wheel accelerometers. A terrain indicator signal in the form of a roughness output signal 26 is output from the road roughness module 24.

The estimates for the wheel longitudinal slip and the lateral friction estimation are compared with one another within the estimator module 18 as a plausibility check.

Calculations for wheel speed variation and corrugation output, the surface rolling resistance, estimation, the wheel longitudinal slip and the corrugation defection, together with the friction plausibility check, are output from the estimator module 18 and provide terrain indicator output signals 22, indicative of the nature of the terrain in which the vehicle is travelling, for further processing within the VCU 10.

The terrain indicator signals 22 from the estimator module 18 are provided to the selector module 20 for determining which of a plurality of vehicle subsystem control modes (and therefore corresponding subsystem configuration modes) is most appropriate based on the indicators of the type of terrain in which the vehicle is travelling. The most appropriate control mode is determined by analysing the probability that each of the different control modes is appropriate on the basis of the terrain indicator signals 22, 26 from the estimator module 18 and the road roughness module 24.

Figure 4:
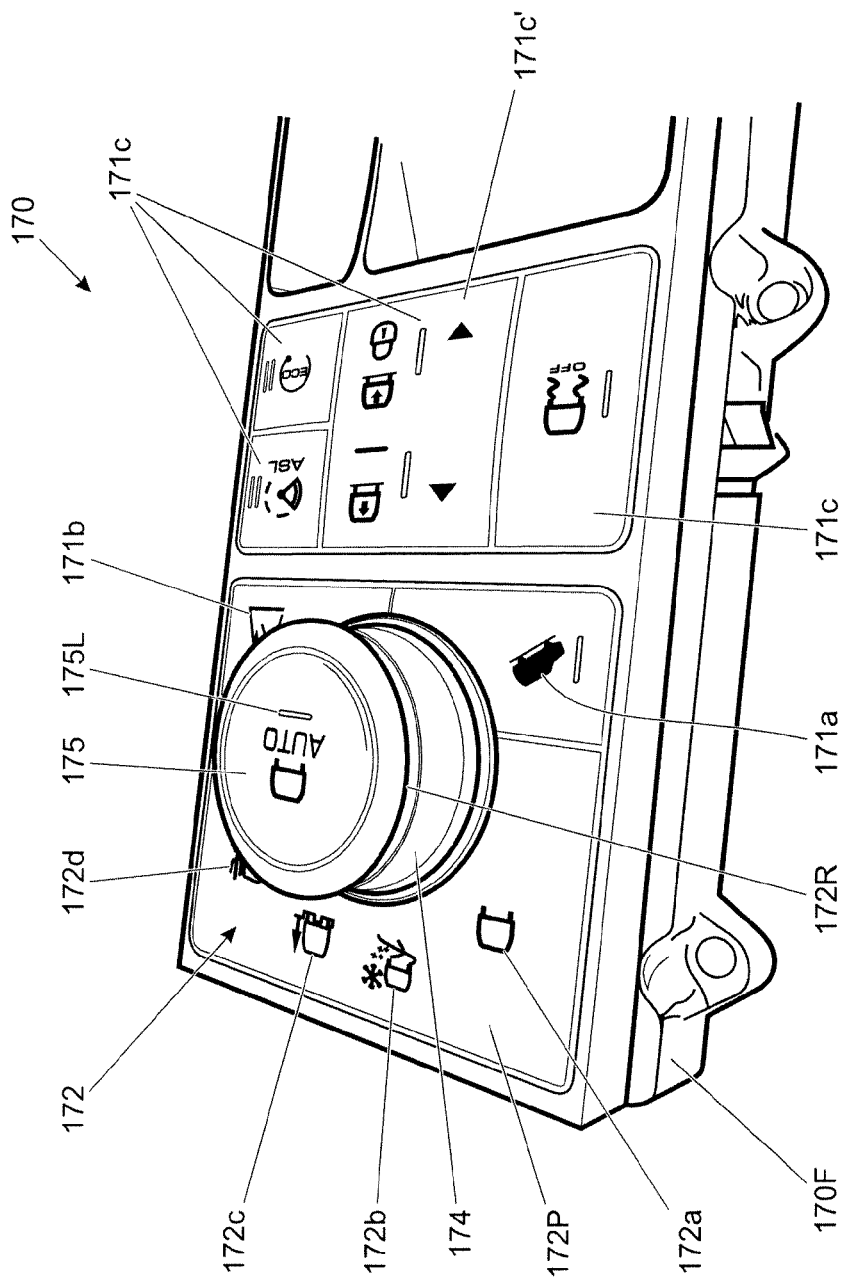
FIG. 4 is a schematic illustration of a switchpack according to an embodiment of the invention with a rotary knob in a deployed condition.

The vehicle subsystems 12 may be controlled automatically in a given subsystem control mode (in an "automatic mode" or "automatic condition" of operation of the VCU 10) in response to a control output signal 30 from the selector module 20 and without the need for driver input. Alternatively, the vehicle subsystems 12 may be operated in a given subsystem control mode according to a manual user input (in a "manual mode" or "manual condition" of operation of the VCU 10) via a Human Machine Interface (HMI) module 32. Thus the user determines in which subsystem control mode the subsystems will be operated by selection of a required system control mode (operating mode). The HMI module 32 comprises a display screen (not shown) and a user operable switchpack 170 (FIG. 4). The user may select between the manual and automatic modes (or conditions) of operation of the VCU 10 via the switchpack 170. When the VCU 10 is operating in the manual mode or condition, the switchpack 170 also allows the user to select the desired subsystem control mode.

It is to be understood that the subsystem controller 14 may itself control the vehicle subsystems 12a-12e directly via the signal line 13, or alternatively each subsystem may be provided with its own associated intermediate controller (not shown in FIG. 1) for providing control of the relevant subsystem 12a-12e. In the latter case the subsystem controller 14 may only control the selection of the most appropriate subsystem control mode for the subsystems 12a-12e, rather than implementing the actual control steps for the subsystems. The or each intermediate controller may in practice form an integral part of the main subsystem controller 14.

When operating in the automatic mode, the selection of the most appropriate subsystem control mode may be achieved by means of a three phase process:

(1) for each type of control mode, a calculation is performed of the probability that the control mode is suitable for the terrain over which the vehicle is travelling, based on the terrain indicators;

(2) the integration of "positive differences" between the probability for the current control mode and the other control modes; and (3) the program request to the control module 14 when the integration value exceeds a predetermined threshold or the current terrain control mode probability is zero.

The specific steps for phases (1), (2) and (3) will now be described in more detail.

In phase (1), the continuous terrain indicator signals in the form of the road surface roughness output 26 and the outputs 22 from the estimator module 18 are provided to the selector module 20. The selector module 20 also receives the discrete terrain indicators 17 directly from various sensors on the vehicle, including the transfer box status signal (whether the gear ratio is set to a HI range or a LO range), the DSC status signal, cruise control status (whether the vehicle's cruise control system 11 is ON or OFF), and trailer connect status (whether or not a trailer is connected to the vehicle). Terrain indicator signals indicative of ambient temperature and atmospheric pressure are also provided to the selector module 20.

The selector module 20 is provided with a probability algorithm 20a for calculating the most suitable control mode for the vehicle subsystems based on the discrete terrain indicator signals 17 received directly from the sensors and the continuous terrain indicators 22, 26 calculated by the estimator module 18 and the road surface roughness module 24, respectively. That is, the probability algorithm 20a calculates the most suitable system control mode, which determines the respective subsystem configuration mode in which each subsystem is to be operated, based on the discrete terrain indicator signals 17.

The control modes typically include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode or SPO mode) which is a suitable compromise mode, or general mode, for all terrain conditions and especially vehicle travel on motorways and regular roadways. Many other control modes are also envisaged including those disclosed in US2003/0200016, the content of which is hereby incorporated by reference.

The different terrain types are grouped according to the friction of the terrain and the roughness of the terrain. For example, it is appropriate to group grass, gravel and snow together as terrains that provide a low friction, smooth surface and if is appropriate to group rock and boulder terrains together as high friction, very high roughness terrains.

FIG. 3 is a table taken from US2003/0200016 showing the particular sub-system configuration modes assumed by the subsystems 12 of the vehicle 100 in the respective different operating modes in which the VCU 10 may operate.

The operating modes are:
(a) A motorway (or highway) mode;
(b) A country road mode;
(c) A city driving (urban) mode;
(d) A towing (on-road) mode;
(e) A dirt track mode;
(f) A snow/ice (on-road) mode;
(g) A GGS mode;
(h) A sand mode;
(i) A rock crawl or boulder crossing mode; and
(j) A mud/rots mode With reference to FIG. 3, the configuration of the suspension system 12e is specified in terms of ride height (high, standard or low) and side/side air interconnection. The suspension system 12e is a fluid suspension system, in the present embodiment an air suspension system, allowing fluid interconnection between suspensions for wheels on opposite sides of the vehicle in the manner described in US2003/0200016. The plurality of subsystem configuration modes provide different levels of said interconnection, in the present case no interconnection (interconnection closed) and at least partial interconnection (interconnection open).

The configuration of the ePAS steering unit 12c may be adjusted to provide different levels of steering assistance, wherein steering wheel 181 is easier to turn the greater the amount of steering assistance. The amount of assistance may be proportion to vehicle speed in some operating modes.

The brakes system 12d may be arranged to provide relatively high brake force for a given amount of pressure applied to the brake pedal 163 or a relatively low brake force, depending on the operating mode.

The brakes system 12d may also be arranged to allow different levels of wheel when an anti-lock braking system is active, (relatively low amounts on low friction ("low-mu" surfaces) and relatively large amounts on high friction surfaces).

Art electron fraction control (ETC) system may be operated in a high mu or low my configuration, the system tolerating greater wheel slip in the low mu configuration before intervening in vehicle control compared with a high mu configuration.

A dynamic stability control system (DSC) may also be operated in a high mu or low mu configuration.

The engine management system 12a may be operated in 'quick' or 'slow' accelerator (or throttle) pedal progression configuration modes in which an increase in engine torque as a function of accelerator pedal progression is relatively quick or slow, respectively. The rate may be dependent on speed in one or more modes such as Sand mode.

The PTU 137 may be operated in a high range (HI) subsystem configuration mode or low range (LO) subsystem configuration mode as described herein.

The transmission 124 may be operated in a "normal" mode that provides a reasonable compromise between fuel economy and driving performance, a "performance" mode which generally keeps the transmission in lower gears than in the normal mode, particularly when the driver is requesting a high level of driving torque to accelerate the vehicle, and a "manual" mode in which the control of gear changes is given completely to the driver. There is also a "snow" or "ice" mode which generally keeps the transmission in higher gears than the normal mode, in particular under acceleration from rest, to avoid loss of traction due to wheel spin, and a "sand" mode which keeps the transmission in relatively high gears at low speed to avoid excessive wheel spin. Excessive wheel spin can result in the wheels digging themselves into the sand at low speeds. However, the sand mode uses relatively low gears at higher speeds where a relatively high degree of wheel slip can be desirable to provide maximum traction. Lower gearing also helps the engine 121 to remain in an operating region where the engine speed is high and the power output is high, thereby helping to avoid the vehicle 100 becoming "bogged down" by a lack of power.

In some embodiments, a centre differential and a rear differential each include a clutch pack and are controllable to vary the degree of locking between a "fully open" and a "fully locked" state. The actual degree of locking at any one time may be controlled on the basis of a number of factors in a known manner, but the control can be adjusted so that the differentials are "more open" or "more locked". Specifically the pre-load on the clutch pack can be varied which in turn controls the locking torque, i.e. the torque across the differential that will cause the clutch, and hence the differential, to slip. A front differential could also be controlled in the same or similar way.

For each subsystem control mode, the algorithm 20a within the selector module 20 performs a probability calculation, based on the terrain indicators, to determine a probability that each of the different control modes is appropriate. The selector modulo 20 includes a tuneable data map which relates the continuous terrain indicators 22, 26 (e.g. vehicle speed, road roughness, steering angle) to a probability that a particular control mode is appropriate. Each probability value typically fakes a value of between 0 and 1. So, for example, the vehicle speed calculation may return a probability of 0.7 for the RB mode if the vehicle speed is relatively slow, whereas if the vehicle speed is relatively high the probability for the RB mode will be much lower (e.g. 0.2). This is because it is much less likely that a high vehicle speed is indicative that the vehicle is travelling over a rock or boulder terrain.

In addition, for each subsystem control mode, each of the discrete terrain indicators 17 (e.g. trailer connection status ON/OFF, cruise control status ON/OFF) is also used to calculate an associated probability for each of the control modes, GGS, RB, Sand, MR or SP OFF. So, for example, if cruise control is switched on by the driver of the vehicle, the probability that the SP OFF mode is appropriate is relatively high, whereas the probability that the MR control mode is appropriate will be lower.

For each of the different sub system control modes, a combined probability value, Pb, is calculated based on the individual probabilities for that control mode, as described above, as derived from each of the continuous or discrete terrain indicators 17, 22, 26. In the following equation, for each control mode the individual probability as determined for each terrain indicator is represented by a, b, c, d . . . , n. The combined probability value, Pb, for each control mode is then calculated as follows:

$$Pb=(a,b,c,d, \ldots n)/((a,b,c,d, \ldots ,n)+(1-a),(1-b),(1-c),(1-d) \ldots (1-n))$$

Any number of individual probabilities may be input to the probability algorithm 20a and any one probability value input to the probability algorithm may itself be the output of a combinational probability function.

Once the combined probability value for each control mode has been calculated, the subsystem control program corresponding to the control mode with the highest probability is selected within the selector module 20 and an output signal 30 providing an indication of this is provided to the subsystem control module 14. The benefit of using a combined probability function based on multiple terrain indicators is that certain indicators may make a control mode (e.g. GGS or MR) more or less likely when combined together, compared with basing the selection on just a single terrain indicator alone.

A further control signal 31 from the selector module 20 is provided to a control module 34.

In phase (2), an integration process is implemented continually within the selector module 20 to determine whether it is necessary to change from the current control mode to one of the alternative control modes.

The first step of the integration process is to determine whether there is a positive difference between the combined probability value for each of the alternative control modes compared with the combined probability value for the current control mode.

By way of example, assume the current control mode is GGS with a combined probability value of 0.5. If a combined probability value for the sand control mode is 0.7, a positive difference is calculated between the two probabilities (i.e. a positive difference value of 0.2). The positive difference value is integrated with respect to time. If the difference remains positive and the integrated value reaches a predetermined change threshold (referred to as the change threshold), or one of a plurality of predetermined change thresholds, the selector module 20 determines that the current terrain control mode (for GGS) is to be updated to a new, alternative control mode (in this example, the sand control mode). A control output signal 30 is then output from the selector module 20 to the subsystem control module 14 to initiate the sand control mode for the vehicle subsystems.

In phase (3), the probability difference is monitored and if, at any point during the integration process, the probability difference changes from a positive value to a negative value, the integration process is cancelled and reset to zero. Similarly, if the integrated value for one of the other alternative control modes (i.e. other than sand), reaches the predetermined change threshold before the probability result for the sand control mode, the integration process for the sand control mode is cancelled and reset to zero and the other alternative control mode, with a higher probability difference, is selected.

HDC Interaction

As described above, the vehicle 100 has an HMI module 32 comprising a user operable switchpack 170 shown schematically in FIG. 4. The switchpack 170 allows a user to toggle the VCU 10 between the automatic and manual conditions of operation.

Figure 5:
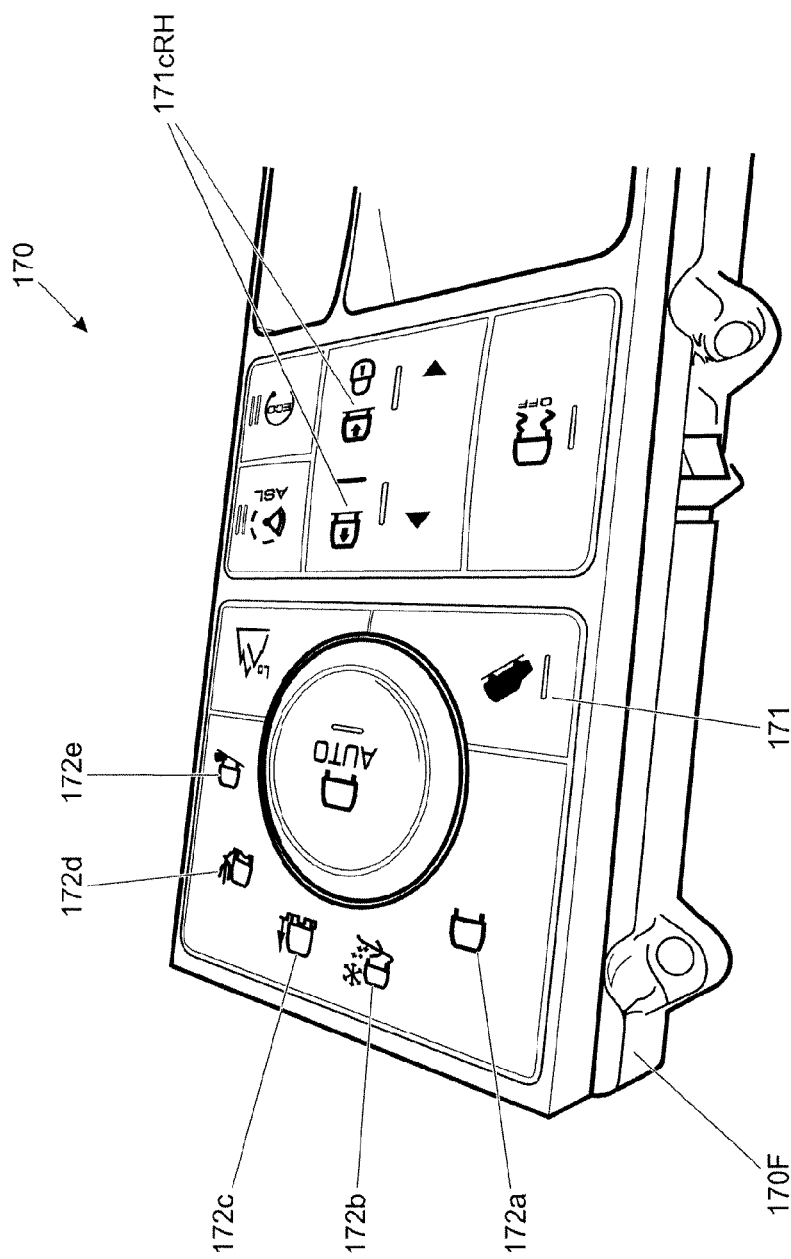
FIG. 5 is a schematic illustration of a switchpack according to an embodiment of the invention with a rotary knob in a retracted condition.

The switchpack 170 has a frame 170F supporting switchgear associated with the switchpack 170. The switchpack 170 has a rotary knob 172 connected to a multistable rotary switch (not shown). The knob 172 may be moved between an exposed or deployed position as shown in FIG. 4 and a refracted position as shown in FIG. 5. In the exposed position the knots 172 stands proud of a panel 172P which surrounds the knob 172. Icons 172a-e are marked in the panel at circumferentially spaced apart locations around the knob 172 over an arc of around 140° in the embodiment shown although other angles and other numbers of modes are also useful. The icons 172a-e may be illuminated selectively. In order to indicate the identity of the control mode in which the subsystems 12 are being operated.

Other switches 171a, b are also provided in a remaining portion of the panel 172P allowing a driver to activate a hill descent control (HDC) function, via switch 171a, and select a required gear ratio of the PTU 137 ('high' or 'low'), via switch 171b.

Further switches 171c of the switchpack enable the SCS system of the vehicle to be activated or deactivated, a ride height to be adjusted (buttons 171 c'), an 'eco' mode (arranged to enhance fuel economy) to be selected and an automatic speed limiter (ASL) function to be selected.

The rotary knob 172 has a substantially cylindrical column portion 174 with its cylinder axis oriented substantially vertically. The knob 172 has an upper panel 175 bearing the word 'AUTO'. When the knob 172 is in the retracted position an indicator lamp 175L of the panel 175 illuminates, indicating that the VCU 10 has assumed the automatic condition in which the VCU 10 selects automatically an appropriate subsystem control mode.

When the knob 172 is in the exposed position the indicator lamp 175L is extinguished, indicating that the VCU 10 has assumed the manual condition. The knob 172 is moved between the exposed and retracted positions by means of a spring mechanism triggered by pressing on the panel 175. Other arrangements are also useful such as an electrical actuator. In some embodiments a switch is integrated into the knob 172 such that pressing on the panel 175 alone actuates the switch to switch between the automatic and manual conditions. In some embodiments the switch is positioned such that sufficient axial pressure applied to substantially any exposed portion of the knob 172 including rim 172R results in actuation of the switch. The knob 172 may be configured to exercise a relatively small axial translation when the switch is actuated, providing tactile feedback to the user, followed by a relatively large axial translation as the knob 172 moves between the exposed and retracted positions or vice versa.

The knob 172 is configured such that the rim 172R may be grasped by the user and rotated about a cylinder axis of the column portion 174. The switchpack 170 is arranged such that the VCU 10 may determine in which direction the user turns the rim 172R based on a signal output by the switchpack 170. In an example rim 172R is provided with a knurled peripheral surface arranged to facilitate the user grasping the knob 172 with their fingers.

Rotation of the rim 172R is indexed in discrete angular increments of around 10-20° by means of a detent mechanism. This allows tactile feedback to be provided to a user confirming when the knob 172 has been rotated through one of the discrete angular increments. Other angles and other arrangements are also useful. The rim 172R may be rotated by any number of turns in either direction without constraint by the switchpack 170.

In some embodiments, when the VCU 10 is in the manual condition, rotation of the rim 172R by two increments in a clockwise (or anticlockwise) direction causes the VCU 10 to assume the mode corresponding to the icon 172a-e that is located adjacent the icon corresponding to the currently selected mode in a clockwise (or anticlockwise) direction. If no such icon exists then the VCU 10 takes no action and the currently selected mode remains selected. If the user rotates the knob 172R by only a single increment in a given direction, with no further increment in that direction within a prescribed time period (such as 1 s or any other suitable period), no change in control mode takes place. This feature reduces a risk that a user unintentionally changes the selected mode. It is to be understood that any prescribed number of turns by the incremental amount may be required in order to enable a mode change to take place. Furthermore, any prescribed time period may be set within which the prescribed number of turns by the incremental amount (or in addition, or instead any two consecutive incremental amounts) are to take place. In some embodiments, a user is required to rotate the rim 172R by only a single incremental amount in order to signal a requirement to change mode.

In some embodiments, in addition to or instead of rotating the rim 172R of the knob 172 in order to change control mode when the VCU 10 is in the manual condition, the knob 172 may be configured such that mode changes may be effected by rotation of column 174. In some embodiments the rim 172R may be rotatable whilst the column 174 remains stationary, whilst in some alternative embodiments the rim 172R and column 174 may be arranged to rotate together. They may for example be fixedly coupled or integrally formed in some embodiments.

In some embodiments, the VCU 10 may be configured to allow manual selection of a given control mode following user selection of that mode only once it has determined that the user has finished rotating the rim 172R. The VCU 10 may wait a prescribed period of time after the last incremental rotation has been detected, for example up to around 2 s, before allowing a mode change to take place. In some embodiments the VCU 10 may be arranged to effect a mode change a predetermined time after it has been determined that the user has released their grip from the knob 172.

In some embodiments the VCU 10 may be arranged to verify that one or more prescribed vehicle settings or parameters are appropriate to the mode the user wishes to select before allowing a mode change. For example, the VCU 10 may check one or more selected from amongst selected PTU gear ratio, selected ride height and/or one more other settings. If the settings are not appropriate to the mode the user wishes to select, the VCU 10 may be configured to remain in the current control mode until the settings are determined to be appropriate. In the meantime the VCU 10 may cause the icon of the currently selected mode to remain illuminated. The icon corresponding to that of the mode the user wishes the VCU 10 to assume may be arranged to illuminate intermittently in some embodiments, e.g. by flashing. The user may be informed of the one or more deficiencies in settings identified by the VCU 10. If they are not remedied within a prescribed period of time, or in some embodiments if an attempt to remedy them is not commenced within a prescribed period, the VCU 10 may be configured to operate as if the user had not sought to change mode. That is, information in respect of deficiencies is not displayed any longer, and flashing of the icon corresponding to the proposed mode is terminated.

It is to be understood that when a user activates the automatic condition of the VCU 10 the VCU 10 controls the vehicle subsystems to operate in the most appropriate control mode as determined by the VCU 10. The rotary knob 172 assumes the retracted position and any rotation of the rim 172R by a user does not cause a change in the selected control mode. Rather, it is ignored by the VCU 10.

If whilst the VCU 10 is in the automatic condition the manual condition is activated, the VCU 10 controls the vehicle subsystems automatically to assume the SPO control mode, being the mode intended to provide the best compromise in vehicle subsystem adjustment/set-up (configuration) for normal road and light off-road use. The knob 172 also assumes the exposed position. Icon 172a, which corresponds to the SPO mode, is illuminated.

If a user wishes to select a mode other than the SPO mode, he or she may grasp the rim 172R and rotate the rim 172R in a clockwise direction to select the appropriate mode. If the rim 172R is rotated by two indexed angular increments and the user waits for 2 s, the VCU 10 assumes the GGS mode. Icon 172a is no longer illuminated and icon 172b becomes illuminated. If the rim 172R is rotated by two further angular increments, the vehicle will assume MR mode, icon 172b will no longer be illuminated and icon 172c will be illuminated instead, and so forth. As noted above, the number of angular increments may be any suitable number such as 1, 3 or any other suitable number. Any other suitable user wait period may also be employed.

Thus it is to be understood that the angular position of the rim 172R when the automatic condition was last selected is irrelevant to the determination of the control mode the VCU 10 will assume when the manual condition is subsequently selected. Regardless of the control mode that was selected when the knob 172 was last retracted, when the knob 172 is subsequently exposed VCU 10 selects the SPO control mode. Because the rim 172R is freely rotatable without constraint (due to the absence of features constraining rotation such as an end stop to prevent further rotation in a given direction) the actual (absolute) angular position of the rim 172R is irrelevant. It is to be understood that if this feature were not employed and the rim 172R were required to be in a prescribed absolute rotational position in order to select SPO mode, additional (automatic) actuation of the rim 172R by the switchpack 170 would be required when transitioning from the automatic to manual conditions of the VCU 10. For example, if the rim 172R had been set to select RB mode prior to the user selecting the automatic condition of the VCU 10, the switchpack 170 would be required to rotate the rim 172R from the position corresponding to the RB mode to that corresponding to the SPO mode when manual mode were subsequently selected. Additional, potentially complicated failsafe countermeasures would be required.

It is to be understood that in some alternative embodiments, when the automatic condition is deselected and the manual condition is assumed, the VCU 10 may be arranged to remain in the driving mode that was selected automatically by the VCU 10 when in the automatic condition until the user selects a different driving mode by rotation of the rim 172R. Thus, when the manual condition is selected, the icon 172a-e corresponding to the currently (automatically) selected driving mode remains illuminated. If the VCU 10 is configured such that none of icons 172a-e are illuminated when the VCU 10 is in the automatic condition then the icon corresponding to the currently selected driving mode is illuminated when the manual condition is assumed.

It is to be understood that other arrangements are also useful.

It is to be understood that when the VCU 10 is operating in the manual condition, the HDC function may be selected by means of switch 171a. When active, the HDC function limits a rate of progress (i.e. a speed) of the vehicle 100 over ground when descending a slope to a prescribed value by application of a foundation braking system of the vehicle 100. In the vehicle 100 of FIG. 1 the foundation braking system is provided by a friction braking system. In some embodiments the foundation braking system may be provided by a regenerative braking system in addition or instead. HDC functionality is described in UK patents GB2325716, GB2308415, GB2341430, GB2382158 and GB2381597.

It is to be understood that if the vehicle is descending a slope, a user may activate the HDC function by pressing switch 171a. The VCU 10 then assumes control of the foundation braking system and limits the speed at which the vehicle 100 may descend the slope to a user-prescribed value. If the vehicle speed drops below the user-prescribed value the user may increase the speed by pressing the accelerator pedal 161. If the user wishes to decrease speed below the prescribed value temporarily, for example if the user wishes to stop the vehicle, the user may press the brake pedal 163 to activate the foundation braking system in the expected manner.

The VCU 10 is configured wherein if the VCU 10 is operating in the automatic mode selection condition and the user selects the HDC function, the VCU 10 activates the HDC function but suspends any further automatic changes in selected sub-system control mode. That is, the VCU 10 remains in the presently selected control mode when the HDC function is selected. If the VCU 10 is operating in the automatic condition, the VCU 10 may be operable to automatically initialise HDC in a standby mode, such that its function may be armed and waiting to intervene where required. If HDC intervenes whilst the vehicle is travelling with VCU 10 operating in the automatic condition, a control mode change will not be made during the period for which the HDC function is operating and intervening to maintain composed vehicle progress. It is to be understood that HDC function may intervene in some embodiments and become active from a standby condition when it is defected that the vehicle 100 is descending a slope and a driver is not depressing accelerator pedal 161. The HDC function may then cause application of brakes system 12*d* as required in order to prevent vehicle speed from exceeding the HDC target speed value.

In some embodiments the VCU 10 also suspends determination of the most appropriate control mode for the terrain over which the vehicle 100 is travelling until the HDC function is deselected (for example, either turned off or in the standby condition). This feature may reduce a computational burden placed on the VCU 10 whilst the HOC function is active in some embodiments.

In some alternative embodiments the VCU 10 continues to determine the most appropriate control mode for the terrain over which the vehicle 100 is travelling even whilst the HDC function is active. It is to be understood that the reliability of certain terrain indicators used in determining the terrain over which the vehicle 100 is moving may be reduced during HDC intervention. That is, HDC intervention may give rise to an erroneous determination of the type of terrain over which the vehicle is moving and therefore of the most appropriate control mode. Thus the VCU 10 may wait for a prescribed number of wheel rotations to take place, for a prescribed distance to be travelled or for a prescribed time period to elapse once the HDC intervention has ceased before allowing automatic control mode changes to take place.

In some embodiments the VCU 10 may wait for a prescribed time period to elapse or for a prescribed number of wheel rotations to take place or for a prescribed distance to be travelled over terrain having a gradient below a prescribed value before allowing a change in mode to take place automatically.

In some embodiments, when the HDC intervention has ceased, the VCU 10 is arranged to remain in the selected control mode and delay automatic changing of control mode for a prescribed period of time, optionally a prescribed period of from around 5 s to around 2 mins before allowing a change in control mode to be made automatically whilst the VCU 10 is in the automatic condition. Other values are also useful.

In some embodiments when the HDC function is deactivated the VCU 10 is arranged to remain in the selected control mode for a prescribed distance of travel, optionally a distance of from around 2 m to around 200 m before allowing a change in control mode to be made automatically whilst the VCU 10 is in the automatic condition.

This delay (in distance or time) has the advantage that when the VCU 10 returns to automated control mode following cessation of HDC intervention, the vehicle response to the user pressing of the brake and/or accelerator pedals 163, 161 will be in line with that anticipated and expected by the user, and consistent with that experienced by the driver prior to HDC intervention.

In some embodiments, when the VCU 10 activates the HDC function an HDC-specific relationship between accelerator pedal position and torque developed by the powertrain is implemented by the VCU 10. Similarly a predetermined relationship between brake pedal pressure and brake torque applied by means of the foundation braking system may be established in addition or instead. These values may be independent of the control mode in which the VCU 10 is operating.

In some alternative embodiments, the form of the response of the powertrain 129 and/or braking system to accelerator and brake pedal inputs respectively is dependent on the selected control mode and corresponds to that implemented when the VCU 10 is in that control mode and the HDC function is not active. Thus it is to be understood that in such embodiments, the fact that changes in control mode are suspended when the HDC function is active have the advantage that a response of the vehicle to accelerator and brake pedal inputs does not change whilst the HOC function is active, i.e. because the selected control mode is not changed. This reduces a risk that a driver is inconvenienced by a change in vehicle response to accelerator and/or brake pedal control inputs when performing a hill descent operation.

Figure 6:
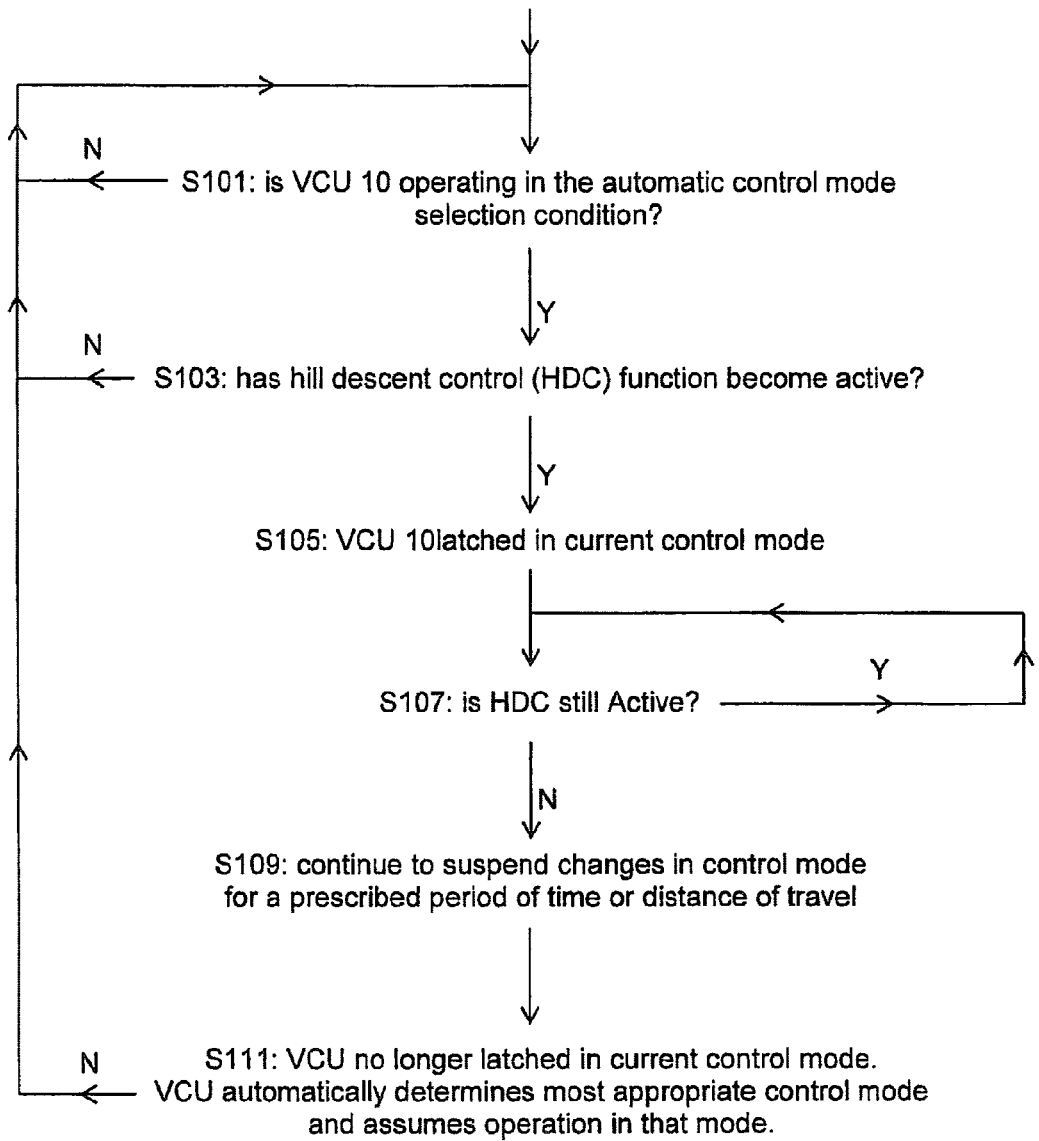
FIG. 6 is a schematic illustration of a method of operation of a vehicle according to an embodiment of the present invention.

FIG. 6 illustrates a method of operating of a vehicle 100 according to an embodiment of the present invention.

At step S101 VCU 10 of vehicle 100 undertakes a determination whether it is operating in the automatic control mode selection condition. The VCU 10 continues to repeat step S101 until it is determined that it is operating in the automatic control mode selection condition, at which time the most appropriate control mode is determined as described above and is automatically selected, and the method continues at step S103.

At step S103 the VCU 10 determines whether the HDC function has become active. If the HDC function has become active the VCU 10 continues at step S105, otherwise the VCU 10 continues at step S101.

At step S105 the VCU 10 latches itself in the control mode in which the VCU 10 is currently operating. That is, the VCU 10 suspends allowance of changes in control mode whilst in the automatic control mode selection condition. The VCU 10 then continues at step S107.

At step S107 the VCU 10 determines whether the HDC function is still active. If the HDC function is still active, the VCU 10 repeats step S107. The VCU 10 continues to remain in the same control mode.

If the VCU 10 is no longer in the active mode or condition the VCU 10 continues at step S109.

At step S109 the VCU 10 continues to suspend changes in control mode for a prescribed period of time or distance of travel. Once the prescribed distance has been travelled or the prescribed period of time has elapsed, the VCU 10 continues at step S111.

At step S111 the VCU 10 becomes no longer latched in the current control mode. The VCU 10 then recommences assuming automatically the control mode that is determined to be the most appropriate according to the methodology described above.

The VCU 10 then continues at step S101.

Some embodiments of the present invention have the advantage that vehicle composure may be preserved and in some embodiments or situations composure may be enhanced. Some embodiments have the advantage that user confidence in vehicle operation, performance and expected response may be enhanced. Automatic terrain recognition and control mode selection may be made with confidence. A user may have greater confidence in the automatic mode selection by the VCU 10 because changes in control mode when the HDC function is active are prevented by suspension of control mode changes whilst the HDC function is active and the VCU 10 is operating in the automatic control mode selection condition.

Cruise Control Interaction

In another aspect of the invention for which protection is sought there is provided a control system for a motor vehicle, the system being operable in an automatic mode selection condition in which the system is operable to select automatically an appropriate system operating mode whereby the system assumes operation in said system operating mode, the system being further operable to activate an automatic progress control function in which a speed of the vehicle over terrain is controlled automatically by the system, wherein when operating in the automatic mode selection condition the system is operable to allow the automatic progress control function to be activated only when the system is operating in a subset of one or more system operating modes.

Advantageously the operating modes are control modes of at least one vehicle subsystem of a vehicle, the system comprising a subsystem controller for initiating control of the or each of the vehicle subsystems in the selected one of the plurality of subsystem control modes, each of which corresponds to one or more different driving conditions for the vehicle, the system comprising evaluation means for evaluating one or more driving condition indicators to determine the extent to which each of the subsystem control modes is appropriate, wherein when in the automatic condition the system is operable automatically to control the subsystem controller to initiate control of the or each subsystem in the subsystem control mode which is most appropriate.

In an aspect of the invention for which protection is sought there is provided a motor vehicle control system for selecting a driving surface and for controlling a plurality of vehicle subsystems to operate in a plurality of subsystem configuration modes in dependence on the selected driving surface, the system being operable in a manual operating condition in which a user is able to select said driving surface and an automatic operating condition in which the system is operable to select said driving surface automatically, wherein the system is able to be switched between said manual and automatic operating conditions by means of a user-operable input device, the system being further operable to activate an automatic progress control function in which a speed of the vehicle over terrain is controlled automatically by the system, wherein when operating in the automatic mode selection condition the system is operable automatically to prevent the automatic progress control function from being activated when the system is operating in a prescribed one or more of the subsystem configuration modes.

It is to be understood that the control system is thus operable automatically to suspend allowance of the automatic progress control functionality when operating in the prescribed one or more subsystem configuration modes. The system may be configured such that it will always prevent allowance of the automatic progress control functionality when operating in the prescribed one or more subsystem configuration modes when operating in the automatic mode selection condition.

Embodiments of the invention have the advantage that when the system is operating in the automatic mode selection condition, a user may be prevented from causing the system to activate the automatic progress control function when the system has selected automatically an operating mode that is inappropriate to the automatic progress control function.

The automatic progress control function may advantageously be or include a cruise control function. The cruise control function may be operable to control a powertrain of the vehicle to maintain a prescribed vehicle speed which is set by the user.

Typically, in conventional vehicles cruise control functionality is allowable only above a prescribed speed. In some vehicles having a power transfer unit (PTU) or the like having high and low gear ratio modes cruise control functionality may be available only when operating in the high ratio mode.

Embodiments of the present invention have the advantage that the system is able to prevent a user from selecting cruise control functionality in potentially inappropriate conditions.

Advantageously the prescribed one or more subsystem configuration modes include an on-road driving mode.

Optionally cruise control functionality may be allowable when operating in an on-road driving mode (a general purpose mode, referred to herein as SPO). Optionally cruise control functionality may also be allowable when the system is operating in a grass/gravel/snow subsystem control mode (GGS mode) that is suitable for when the vehicle is travelling in grass, gravel or snow terrain.

In some embodiments cruise control functionality is not permitted when the system is operating in the automatic mode selection condition and a mode other than the on-road driving mode or GGS mode has been selected automatically.

Optionally the system is operable to allow the automatic progress control function to be activated only when one or more further conditions are met. The one or more further conditions may include the condition that a selected powertrain gear ratio is in a prescribed range. Optionally the one or more further conditions may include the condition that a power transfer unit (PTU) of the powertrain is set to a prescribed gear ratio, advantageously a high (e.g. HIGH or HI) gear ratio as opposed to a low gear ratio for certain off-road conditions such as rock crawl where relatively low vehicle speeds are required.

As noted above, the still further condition may exist that cruise control mode may only be available provided the high gear ratio is selected in respect of the power transfer unit.

The on-road driving mode may correspond to the special programs off (SPO) mode described above.

In the embodiment of the invention shown in the accompanying drawings, a vehicle cruise control function implemented by the VCU 10 may be selected and activated by means of the cruise control selector 181C mounted to the steering wheel 181 of the vehicle 100. In the embodiment of FIG. 1 the VCU 10 is configured to allow the cruise control function to be activated whether the VCU 10 is operating in the manual or automatic conditions, provided prescribed criteria are met.

When operating in the manual condition in which a user may select manually a required driving mode the VCU 10 is arranged to allow the cruise control function to be activated provided the PTU is operating in the high ratio range and a speed of the vehicle 100 exceeds a prescribed value. In the present, embodiment the prescribed speed is around 30 km/h although other values are also useful. In some embodiments the VCU 10 is configured to allow selection of a prescribed one or more driving modes only when the PTU is operating in the low ratio range, i.e. certain driving modes are not available when the PTU is operating in the high ratio range.

In some embodiments, when operating in the manual condition the VCU 10 is operable to allow the cruise control function to be activated and deactivated by means of user control 181C provided the user has selected the SPO mode.

When operating in the automatic condition the PTU 10 is operable to allow the cruise control function to be activated provided the PTU 137 is set to the high gear ratio and the VCU 10 has selected automatically either the SPO mode or GGS mode. Other arrangements are also useful.

Detected Trailer

In another aspect of the invention for which protection is sought there is provided a control system for a motor vehicle, the system being operable in an automatic mode selection condition in which the system is operable to select automatically an appropriate system operating mode whereby the system assumes operation in said system operating mode, wherein when operating in the automatic mode selection condition the system is operable to prevent selection of a prescribed one or more operating modes if it is determined that the vehicle is towing a load.

Advantageously the operating modes are control modes of at least one subsystem of a vehicle, the system comprising a subsystem controller for initiating control of the or each of the vehicle subsystems in the selected one of the plurality of subsystem control modes, each of which corresponds to one or more different driving conditions for the vehicle, the system comprising evaluation means for evaluating one or more driving condition indicators to determine the extent to which each of the subsystem control modes is appropriate, wherein when in the automatic condition the system is operable automatically to control the subsystem controller to initiate control of the or each subsystem in the subsystem control mode which is most appropriate.

In an aspect of the invention for which protection is sought there is provided a motor vehicle control system for selecting a driving surface and for controlling a plurality of vehicle subsystems to operate in a plurality of subsystem configuration modes in dependence on the selected driving surface, the system being operable in a manual operating condition in which a user is able to select said driving surface and an automatic operating condition in which the system is operable to select said driving surface automatically, wherein the system is able to be switched between said manual and automatic operating conditions by means of a user-operable input device, the system being further operable to prevent selection of one or more of the subsystem configuration modes in dependence on a determination as to whether the vehicle is towing a load.

The system may be operable to determine whether or not the vehicle is towing a load according to an input signal indicating whether the vehicle is towing. Alternatively or in addition the system may be operable to determine whether the vehicle is towing by monitoring one or mere vehicle parameters and determining whether a value of one or more parameters and/or a variation in a value of one or more parameters over time is indicative of towing.

It is to be understood that when a vehicle is towing a load, an amount of drag on the vehicle is increased due to the weight of the load towed, and increased air resistance. In some embodiments the control system may monitor drag on the vehicle in order to determine the most appropriate subsystem control mode for vehicle operation.

It is possible that when a trailer is connected, the system may falsely determine that the vehicle is travelling over a high drag surface such as sand and select a corresponding subsystem configuration mode. This mode may be inappropriate when towing, for example due to a change in powertrain response to accelerator pedal input that is implemented by the mode. Accordingly, embodiments of the present invention have the advantage that when the vehicle is towing and the system is operating in the automatic selection condition, the system is prevented from selection one or more prescribed subsystem operating modes that may be inappropriate when towing.

It is to be understood that in some embodiments a user may still select such a mode when towing by deselecting the automatic operating condition of the system.

In an embodiment the system is operable to prevent selection of a subsystem configuration mode that increases a responsiveness of a powertrain to an accelerator control input. In some embodiments having a subsystem control mode optimised for travel over sand the system may be operable to prevent selection of that mode.

Advantageously, if the system is operating in the automatic selection condition and it is determined that the vehicle is towing, the system is configured automatically to assume the manual selection condition. The system may notify a user that the operating condition has changed, for example by providing a corresponding warning via a display panel such as an HMI display.

In some embodiments, the system may rely on detection of an electrical connection between a trailer and the vehicle in order confidently to determine that the vehicle is towing.

It is to be understood however that such electrical connections are prone to damage. Furthermore, it is known that some users may choose to mechanically hitch a trailer without making an electrical connection if they wish to move a vehicle on private land, or if the electrical connections on the trailer do not match those of the vehicle.

Accordingly, in some embodiments in addition or instead the system may monitor changes in vehicle rolling resistance and/or drag in order to detect coupling of a trailer to the vehicle. For example if an increase in drag by more than a prescribed threshold is detected immediately following starting of the vehicle from rest after the vehicle has been stationary for longer than a prescribed period, the system may determine that a trailer has been coupled to the vehicle. In some embodiments the system may cheek for one or more other indicators that the vehicle is towing and not driving on sand before determining that a trailer has been coupled. The system may check seat occupancy data and/or door opening history as described below.

In some embodiments the system may employ data from one or more front or rear mounted parking sensors such as park distance control (PDC) sensors. It is to be understood that when a vehicle is in motion and lowing, it is expected that the sensors will detect an object following the vehicle a constant distance from the vehicle, and typically within 2 m of the vehicle. In addition, left-hand and right-hand outboard sensors are expected to detect complimentary changes in distance to the object due to cornering. For example if a distance from a left hand sensor to the object decreases by distance X, a corresponding increase in distance to the object would be expected in respect of the right-hand sensor. Such a change would be indicative of cornering to the left. Correspondingly opposite changes would be expected in respect of cornering to the right.

In some embodiments the system is configured to analyse road roughness data obtained by monitoring front and rear wheel suspension articulation when travelling in a substantially straight line and determine whether one or more characteristics or trends are present in the data indicative of towing. In an example, if the vehicle is towing a trailer, articulation of a rear suspension whilst towing is likely to be influenced by the increased vertical loading at the tow hitch due to the presence of the trailer, which may be around 150 kg in some embodiments.

In order to increase a likelihood that the system correctly determines the vehicle is towing, the system may be operable to take into account seat occupancy data in determining whether a change in suspension articulation is due to the presence of one or more passengers. Similarly the system may take into account the presence of luggage in a luggage compartment. In some embodiments door opening history may be employed in addition or instead, for example to determine whether a user may have placed luggage in a luggage compartment thereby giving rise to the change in suspension articulation. In addition or instead door opening history may be employed to determine whether one or more passengers may have entered or exited the vehicle.

In some embodiments if an increase in rolling resistance only exceeds a threshold after the system detects a drop in rear ride height, then the system may determine that the vehicle has been coupled to a trailer.

Other strategies are useful and some strategies may be used together in order to increase confidence in the resulting determination.

In some embodiments, if the system defects that the vehicle is towing a frailer prior to key-on, the system may be arranged to store data in respect of the last known rolling resistance of the vehicle for use in determining which subsystem control mode to select immediately after key-on (if the automatic operating condition is selected). If the vehicle comes to rest and is subsequently switched off (key-off) whilst towing a trailer, but following key-on, no trailer is defected (for example because an electrical connection to a trailer cannot be detected), the system may compare current rolling resistance data with last known rolling resistance data. If the data is sufficiently similar the system may determine that the trailer is still being towed.

It is to be understood that in some arrangements, when the system is operating in the automatic selection condition the system may permit the driver to override prevention of selection of one or more subsystem control modes by selecting the manual selection condition. In the manual selection condition the user may select any required mode subject to any further constraints such as selection of an appropriate powertrain gear ratio.

It is to be understood that in some embodiments it may not be possible for the system to make an accurate automated determination whether terrain over which the vehicle is travelling is suited to the sand control mode if vehicle drag increases above a predetermined threshold due to towing. Thus, in some embodiments, when in the automatic selection condition the system is configured not to select the sand subsystem control mode when the system defects that the vehicle is towing.

It is to be understood that in some embodiments if the system is operating in the automatic selection condition the system may be configured to notify the user when operation in one or more control modes has been suspended due to a determination that the vehicle is towing. This is so as to make the user aware of the limited range of control modes available whilst the system is operating in the automatic selection condition. Notification may be made by means of an HMI display and/or any other suitable means including an audible notification.

Additionally or alternatively, the system may be arranged to operate in the manual selection condition only, when it is determined that the vehicle is towing.

In an embodiment, if the system is operating in the automatic selection condition prior to detection of a trailer being coupled to the vehicle, the system may automatically assume the manual selection condition and operate in the SPO (on-road) control mode upon detection of the presence of a trailer.

With reference to the embodiment illustrated in the figures having a switchpack 170 and rotary knob 172, if the system is operating in the automatic selection condition when the presence of a trailer is detected, the rotary knob 172 may be arranged to move from the retracted to the deployed position.

Thus an indication is provided to the user that the automatic selection condition is not available when in the automatic selection condition, but that the system may operated in other subsystem control modes according to user selection if required.

In some embodiments, the system may be configured to cancel operation in the automatic selection condition, or limit the available modes when operating in the automatic selection condition, only if a trailer is detected whilst a transmission of the vehicle is in a Park mode (in the case of an automatic transmission), the vehicle is stationary, or the presence of a trailer is detected after the vehicle has been stationary but before the vehicle exceeds a predetermined speed. This feature has the advantage that a change in vehicle behaviour whilst traveling above the predetermined speed due to an automatic change in subsystem control mode may be prevented. Furthermore, if an electrical fault occurs for example in the electrical tow hitch connector and/or associated harness, a probability of an automatic change in system operation during the course of a drivecycle or journey with the trailer still connected is reduced, reducing a risk that driver inconvenience is caused due to the change in vehicle behaviour as a consequence of the electrical fault.

Figure 7:
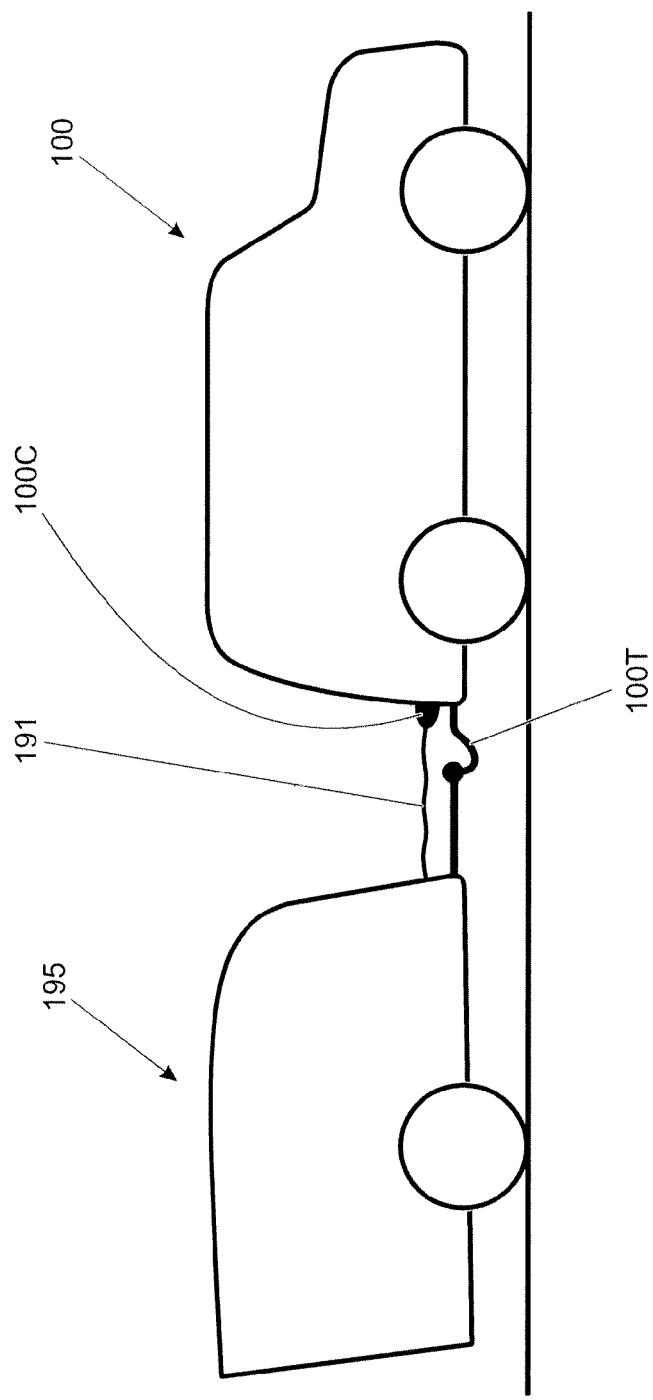
FIG. 7 is a schematic illustration of a vehicle according to an embodiment of the present invention towing a trailer.

With reference to the accompanying drawings, the vehicle 100 of FIG. 1 is shown in FIG. 7 towing a trailer 195. The trailer 195 is connected to the vehicle 100 by means of a tow hitch or hook 100T of the vehicle 100. The trailer 195 has an electrical service cable 191 that is connectable to a corresponding connector 100C of the vehicle 100. This allows the vehicle to supply power to rear lamps of the trailer 195 such as indicator lamps, brake lamps, license plate illumination and night riding lamps.

The VCU 10 is configured to detect when a trailer service cable 191 is connected by reference to a corresponding signal transmitted over a controller area network (CAN) bus of the vehicle 100. The CAN bus provides a means by which the VCU 10 and subsystem controllers may communicate with one another.

If the VCU 10 is operating in the automatic condition and it is detected that a trailer is connected, the VCU 10 suspends allowance of selection of the sand mode and provides a corresponding alert to the user via the HMI module 32.

In some embodiments the VCU 10 is operable to determine whether the vehicle 100 is towing by reference to data in respect of suspension articulation, ride height, rolling resistance and/or one or more other parameters in addition or instead in the manner described above.

Embodiments of the present invention have the advantage that vehicle composure may be maintained regardless of whether the vehicle is towing a trailer. Operation of the vehicle and associated control systems is also made more intuitive to a user.

Ride Height Control

In one aspect of the invention for which protection is sought there is provided a control system for a motor vehicle, the system being operable in a manual operating mode selection condition in which a user may select a required system operating mode by means of user-operable mode selection input means, and an automatic mode selection condition in which the system is operable to select automatically an appropriate system operating mode, wherein when operating in the manual condition and a change from the manual condition to the automatic condition is made the system is operable to select a prescribed vehicle ride-height independently of the selected operating mode.

Advantageously the operating modes are control modes of at least one subsystem of a vehicle, the system comprising a subsystem controller for initiating control of the or each of the vehicle subsystems in the selected one of the plurality of subsystem control modes, each of which corresponds to one or more different driving conditions for the vehicle. The system may comprise evaluation means for evaluating one or more driving condition indicators to determine the extent to which each of the subsystem control modes is appropriate. When in the automatic condition the system may be operable automatically to control the subsystem controller to initiate control of the or each subsystem in the subsystem control mode which is most appropriate.

In an aspect of the invention for which protection is sought there is provided a motor vehicle control system for selecting a driving surface and for controlling a plurality of vehicle subsystems to operate in a plurality of subsystem configuration modes in dependence on the selected driving surface, the system being operable in a manual operating condition in which a user is able to select said driving surface and an automatic operating condition in which the system is operable to select said driving surface automatically, wherein the system is able to be switched between said manual and automatic operating conditions by means of a user-operable input device, the system being further operable to select a prescribed vehicle ride-height independently of the selected operating mode when operating in the automatic selection condition.

Embodiments of the invention have the advantage that if whilst operating in the automatic selection condition changes in operating mode take place, a ride height of the vehicle is not changed. This may reduce the number of times a change in ride height is effected whilst operating in the automatic mode selection condition.

It is to be understood that when operating in the manual selection condition, the control system may be configured to allow a certain one or more operating modes to be selected only if a prescribed ride-height has already been selected. In some embodiments the user may be required to raise or lower the ride-height manually, by means of a ride-height control switch, before the control mode may be selected. That is, the system is not configured automatically to raise or lower the ride when a given mode is selected.

It is to be understood that if whilst operating in the automatic mode selection condition the system changed ride-height automatically such that in a certain one or more prescribed modes one ride-height was selected and in a certain one or more other prescribed modes another ride-height was selected, the ride-height might vary repeatedly over the course of a given journey if multiple mode changes take place. Accordingly, embodiments of the invention have the advantage that the number of changes in ride-height that may be made whilst operating in automatic mode may be reduced. This reduces wear of components associated with ride-height changes such as one or more air compressors in the case of air suspension systems.

Optionally the system is operable to change ride-height in dependence on a speed of the vehicle. In some embodiments the system may be operable to select a first ride height when the vehicle speed is above a first prescribed value and a second ride height greater than the first when the vehicle speed is below a second prescribed value. The first and second prescribed values of speed may be the same. Alternatively the first speed value may be higher than the second in order to reduce introduce a hysteresis in respect of ride height as a function of speed and thereby reduce mode chattering. It is to be understood that lowering of ride-height from a raised value has the advantage that vehicle stability may be enhanced at higher speeds. An advantageous decrease in aerodynamic drag may also be enjoyed.

In some embodiments the vehicle may be operable to assume two or more different ride-heights. In some embodiments the vehicle may be operable to assume a first ride-height, a second ride-height, a third ride-height or a fourth ride-height. The first ride-height may be a 'default' or 'nominal' 'on-road' ride-height selected when driving on-road. The second ride-height may be higher than the first and suitable for driving in off-road conditions such as over mud and ruts. It may be referred to as a 'raised ride height'. The third ride-height may be lower than the first and correspond to a 'kneeling' or 'access' ride-height. This ride-height may be selected in order to allow more convenient loading of the vehicle with cargo or passengers.

The fourth ride-height may have a value between the first and third ride-height values and may be assumed automatically when driving above a prescribed speed on-road, allowing a reduction in vehicle wind resistance. This ride-height may be referred to as a 'highway cruise' ride-height. The prescribed speed may have a value of around 50 miles per hour although other arrangements are also useful.

Advantageously, the system may be arranged wherein if the system determines that the vehicle is towing a load, automatic assumption of the prescribed ride-height (typically the raised ride height) is suspended. This has the advantage that if the prescribed ride-height is different from the presently selected ride-height, the ride-height will not be changed. It is to be understood that changing the ride-height (for example by raising the ride-height) may be undesirable if a trailer is connected to the vehicle since if may have an adverse effect on trailer stability, particularly if the trailer has multiple axles.

In some embodiments, the system may be configured automatically to raise ride height from the default or nominal value (or kneeling ride-height) if the user manually selects (with the system in the manual condition) the low range of operation of a power take-off unit in a prescribed one or more operating modes (and optionally for all operating modes). The raising of the ride height may be delayed or otherwise postponed unless and until the vehicle moves away from rest and/or until the system determines all vehicle doors are closed.

In some embodiments the system may suspend allowance of raising of the ride-height in response to user manual request via a control input until a warning has been provided to the user, optionally via a display such as an HMI display. The system may demand that a driver acknowledge the warning before the system allows the change in ride-height. For example the driver may acknowledge the warning by momentarily releasing a ride-height adjuster control and then repeating the desired manual selection. This feature has the advantage that a user may be reminded of potential consequences of ride-height adjustment; if the vehicle is towing, trailer stability may be compromised for example.

Advantageously the system is operable to maintain the prescribed ride-height when operating in the automatic selection condition unless the vehicle speed exceeds a prescribed value.

With reference to the embodiment of FIG. 1, with the VCU 10 operating in the manual condition a user may adjust vehicle ride height (selecting kneeling ride-height, on-road ride height or raised ride height) by means of ride-height adjustment control 171c'. If the user selects a control mode that requires the raised height and the vehicle has on-road ride height selected, the VCU 10 prompts the user to raise the ride height by means of control 171c'. If the user has not selected a required PTU gear ratio, the VCU 10 may also prompt the user to select a required ratio, for example low ratio.

If the user selects operation of the VCU 10 in the automatic condition, the VCU 10 is configured automatically to select the raised ride height. This is so that the VCU 10 may automatically change between control modes without being required to prompt a user to change ride height. Furthermore, the VCU 10 is configured to maintain the raised ride-height regardless of any changes in operating mode made automatic-ally by the VCU 10. This is so as to reduce activity of the ride-height control system and associated wear on vehicle components.

In some embodiments if a ride-height adjustment is required when the automatic condition is selected, the VCU 10 may inform a driver that a ride-height adjustment will take place and request the driver to confirm that the adjustment is permitted. In some embodiments this request for confirmation is only issued in the event the VCU 10 has determined that the vehicle 100 is towing.

Other arrangements are also useful.

Control Mode Memory Management

In a known vehicle control system allowing selection of control modes optimised for different driving conditions, mode selection is entirely manual. The control system (which may also be referred to as a terrain response (TR) control system) responds to a user request for operation in a given control mode according to the position of a control knob. If the control knob has been left in a given mode (such as a grass/gravel/snow, GGS mode) at key-off then the control system will assume the GGS mode at the next key-on, unless the control knob has been adjusted. Thus the position of the control knob determines the control mode that will be assumed by the controller.

Embodiments of the present invention have automatic mode selection functionality and may operate as described elsewhere herein with respect to FIG. 1 and FIG. 2. Embodiments of the invention may for example employ a multi-stable knob for mode selection, optionally of the kind described herein with respect to FIG. 4 and FIG. 5. In some embodiments the physical position of the knob is not indicative of selected mode. In embodiments having a rotatable knob the knob may be rotated through an angle greater than 360°. A user is therefore not provided with a clear indication as to which control mode the system last operated in prior to key-off.

It is to be understood that in some embodiments of the present invention the control system is able to determine confidently the type of terrain over which the vehicle is moving and determine the most appropriate control mode in a relatively short distance of travel (approximately less than two car lengths in some embodiments). When a vehicle moves from rest following key-on, the control system can therefore determine the most appropriate terrain relatively quickly and be ready to command a change in selected mode if required.

The applicant has recognised that since the most appropriate mode may be determined relatively quickly, the vehicle speed may be relatively low when the determination has been made. Furthermore, whether or not the speed is low, it may be possible to command the change relatively soon after the vehicle commences movement. A user of the vehicle may be particularly sensitive to vehicle motion and response of the vehicle to control inputs such as accelerator pedal input. If the control system commands the change as soon as it has determined that a change is needed, soon after starting, a user may perceive that a change in vehicle response has taken place and may perceive the change as a fault. The change may be detrimental to vehicle composure and user enjoyment.

Furthermore, if a user moves a vehicle between forwards and reverse gears directly after key-on, a change in selected mode may take place as a user changes vehicle direction. The user may readily detect the change, and again may perceive the change in behaviour as a fault.

In a still a further aspect of the invention for which protection is sought there is provided a motor vehicle control system for selecting and/or determining a driving surface and for controlling a plurality of vehicle subsystems to operate in a plurality of subsystem configuration or control modes in dependence on the selected/determined driving surface, the system being operable in a manual operating mode in which a user is able to select said driving surface and an automatic operating mode in which the system is operable to select said driving surface automatically, wherein the vehicle control system is provided with a memory arranged to memorise a last selected driving surface and/or subsystem configuration mode and/or control mode that was selected prior to vehicle de-activation or key-off, and upon the next subsequent vehicle activation or key-on, the system is configured to continue operating in the same subsystem configuration mode and/or control mode and to automatically obtain new data in respect of a driving surface over which the vehicle is moving before allowing a change in subsystem configuration mode and/or control mode to take place.

In an embodiment, when operating in the automatic operating mode, the selection of the most appropriate subsystem configuration mode and/or control mode may be achieved by means of a three phase process:

(1) for each type of subsystem configuration mode and/or control mode, a calculation is performed of the probability that the subsystem configuration mode and/or control mode is suitable for the terrain over which the vehicle is travelling (driving surface), based on a plurality of terrain indicators, the terrain indicators being determined according to the value of one or more vehicle operating parameters;

(2) positive differences between the probability for the current subsystem configuration mode and/or control mode and that for each of the other control modes are integrated; and (3) when the integrated value of the positive differences between the current subsystem configuration mode and/or control mode and one of the other subsystem configuration mode and/or control mode exceeds a pre-determined threshold the system assumes that subsystem configuration mode and/or control mode.

In some embodiments, at key-on the integrated value of the positive differences for each subsystem configuration mode and/or control mode is reset to a prescribed value, in some cases substantially zero. In some embodiments the integrated value is set to a respective prescribed value for each mode. In some embodiments, this has the advantage that the system must capture more data as the vehicle moves before it is able to change selected operating mode with confidence. It is to be understood that if the values were not reset to a prescribed value such as zero, and at key-off the values were such that the integrated value of the positive difference between the probability that the current mode is the correct mode and the probability that a different mode is the correct mode is almost at the threshold for change, the threshold may be exceeded very soon after the vehicle resumes motion, triggering a change. Embodiments of the present invention have the advantage that a risk that the threshold is exceeded too soon after the vehicle begins moving may be reduced.

In some embodiments, in addition or instead a value of a parameter indicative of terrain type such as coefficient of surface friction (mu) or any other suitable parameter may be set to a prescribed value at key-off or at key-on. In some embodiments the value of the one or more parameters is set to a value that is at or close to a middle of a range of values allowed for that parameter. Thus in some embodiments the value of mu may be set to 0.5 or any other suitable value. Thus one or more parameters may be state parameters.

Some embodiments of the invention have the feature that a journey may be commenced with the parameters substantially in the middle of a state estimator band. For example, if when a vehicle shuts down (at key-off) it is in GGS mode, when it starts up again (at key-on), the value of mu will not be assumed to be 1, as would normally be the case. Instead it will be assumed to be (say) 0.5 so that the system remains in the GGS mode for a longer period of time. As the vehicle moves over ground the control system will detect prevailing conditions and refine its estimate of the value(s) of the one or more parameters indicative of terrain type accordingly. This has the advantage that the system must capture more data obtained as the vehicle moves before it is able to change selected operating mode with confidence. Initial values may be held or reset based on the most effective set-up for start-up.

In some embodiments the control system may be arranged to memorise the last selected control mode at key-off and/or when another positive indication is provided that a vehicle may remain at the same location for a period of time. In some embodiments the control system memorises the last selected control mode when a transmission of the vehicle is placed into PARK or NEUTRAL. In some embodiments the system then resets to a prescribed value the value of one or more parameters such as the value of surface coefficient of friction of a driving surface, a value corresponding to the integral of positive differences between the probability that the current control mode is the most appropriate mode and the probability that each of the other control modes is the most appropriate mode, or any other suitable parameter.

In an embodiment, the control system may take vehicle load variables into account by monitoring seat occupancy, fuel tank contents etc., so as to make more accurate calculations of one or more parameters such as rolling resistance.

In an embodiment, the control system is arranged to permanently hold the last selected control mode if a user shifts from a forward gear to a reverse gear, and will not change control mode once the user has selected a forward gear until the vehicle has travelled a predetermined distance (such as around 5 m) to give the system time and data samples to re-determine the type of the prevailing terrain.

In an embodiment, the control system is arranged to store data indicative of a last known gear ratio (range) setting of a power transfer unit (or transfer case). If at key-on the gear ratio has changed, the system may be configured to adopt the last known control mode at key-on. In some embodiments the system may be configured to ignore the last known control mode and to use a set of default settings for the vehicle sub-systems. The default sub-system control settings may correspond to one of the control modes, optionally an on-road control mode. This is because a change in selected range indicates the vehicle is most likely about to experience a different use cease from that which it had been used in prior to key-off.

In an embodiment, the control system is arranged to store a last known ride height setting. If the ride-height has changed due to positive manual intervention by a user (for example by commanding a change in ride-height via a user ride height adjustment control) whilst being parked, the control system may be configured to adopt the last known control mode at key-on. Alternatively, in some embodiments the control-system may be configured to ignore the last known control mode and employ a set of default sub-system control settings instead. This is because a change in ride height indicates the vehicle is about to experience a different use case from that which if had been used in prior to key-off. The default sub-system control settings may correspond to one of the control modes, optionally an on-road control mode.

In an embodiment, the control system may be arranged to store data pertaining to one or more parameters, optionally including environmental parameters such as ambient temperature, rain sensor activity, wading sensor activity, tyre pressure monitoring sensor activity (TPMS) and/or one or more other parameters at key off and/or whenever the vehicle gearbox is set to PARK. If the system determines that values or activity have changed significantly at key-on or when the gearbox is shifted from PARK to DRIVE or REVERSE or NEUTRAL, the system may be configured to adopt the last known control mode at subsequent key-on. Alternatively the system may ignore the last known control mode and employ a set of default sub-system control settings. The default sub-system control-settings may correspond to one of the control modes, optionally an on-road control mode.

It is to be understood that this has the advantage for example that if the temperature falls significantly overnight, the system can adapt to the likelihood of there being snow around the car at key-on even though the ground may have been clear of snow at key-off. Monitoring the readings from the TPMS sensors in each wheel may permit TR2 to identify when a driver has raised or lowered all four tyre pressures together whilst the vehicle was parked, indicative of the driver preparing to operate the vehicle in a different use case or operational situation compared with that which was the case before the vehicle was parked.

Some embodiments of the present invention allow the control system more time to obtain data in respect of prevailing terrain conditions when a vehicle first starts moving. This increases a confidence with which the system may command a change in selected control mode when it is determined that a change in control mode is required.

It is to be understood, that in determining vehicle rolling resistance the control system may take into account seat occupancy, fuel tank fill level and/or one or more other parameters in addition or instead.

Embodiments of the present invention help to ensure that operation of the system in respect of the performance of automatic mode changes is as imperceptible as possible to a user. Embodiments of the invention have the advantage of reducing the chance that unnecessary control mode changes take place at the beginning of a journey.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system for a motor vehicle, characterized by: the system being operable in an automatic mode selection condition in which the system is configured to:
   receive a plurality of terrain indicator signals from a plurality of vehicle sensors, said terrain indicator signals representative of a variety of different parameters associated with vehicle motion and status,
   automatically determine, in dependence on said terrain indicator signals, a terrain over which the vehicle is travelling, and
   select automatically an appropriate system operating mode from a plurality of operating modes in dependence on the determined terrain, whereby the system assumes operation in said system operating mode,
   the system being further configured to allow activation of a Hill Descent Control (HDC) system configured to automatically control the speed of the vehicle to maintain substantially constant speed when descending an incline,
   wherein when the HDC system is actively controlling the speed of the vehicle the system is configured automatically to suspend changes in the automatically selected system operating mode.

2. A system as claimed in claim 1 wherein when the HDC system is deactivated the system is configured to continue to suspend changes in the selected system operating mode for a prescribed period of time or a prescribed distance of travel.

3. A system as claimed in claim 1 further operable in a manual operating mode selection condition in which a user may select a required system operating mode by means of user-operable mode selection input device, the system being configured to allow a user to select the required operating condition by means of a user operable condition selection input device, the system being configured to assume the user selected operating mode.

4. A system as claimed in claim 3 wherein when operating in the manual operating mode selection condition with the HDC system activated the system is configured to allow a change in selected operating mode when the user-operable mode selection input device indicates a user requires a change in operating mode.

5. A system as claimed in claim 1 configured to activate the HDC system in response to a user command to activate the HDC system.

6. A control system according claim 1 wherein the plurality of operating modes are a plurality of control modes of at least one subsystem of a vehicle, the system comprising a subsystem controller for initiating control of the or each of the vehicle subsystems in the selected one of the plurality of subsystem control modes, each of which corresponds to one or more different terrains.

7. A control system according to claim 6 wherein the system comprises a processor having software thereon to evaluate one or more terrain indicators to determine the extent to which each of the subsystem control modes is appropriate.

8. A control system according to claim 7 wherein when in the automatic condition the system is configured automatically to control the subsystem controller to initiate control of the or each subsystem in the subsystem control mode which is most appropriate.

9. A control system according to claim 6 wherein the operating modes are control modes of at least one vehicle subsystem selected from amongst an engine management system, a transmission system, a steering system, a brakes system and a suspension system.

10. A control system according to claim 9 wherein the operating modes are control modes of at least two vehicle subsystems selected from amongst an engine management system, a transmission system, a steering system, a brakes system and a suspension system.

11. A control system according to claim 6 wherein in each system operating mode the system is configured to cause each one of a plurality of vehicle subsystems to be operated in a subsystem configuration mode appropriate to the terrain, and wherein the operating modes include one or more of:
   control modes of a suspension system and the plurality of subsystem configuration modes comprise a plurality of ride heights;
   control modes of a fluid suspension system in which fluid interconnection can be made between suspensions for wheels on opposite sides of the vehicle, and wherein said plurality of subsystem configuration modes provide different levels of said interconnection;
   control modes of a steering system which can provide steering assistance, and wherein said plurality of subsystem configuration modes provide different levels of said steering assistance;
   control modes of a brakes system which can provide braking assistance, and said plurality of subsystem configuration modes provide different levels of said braking assistance;
   control modes of a brake control system which can provide an anti-lock function to control wheel slip, and said plurality of subsystem configuration modes allow different levels of said wheel slip;
   control modes of a traction control system which is arranged to control wheel spin, and said plurality of subsystem configuration modes allow different levels of said wheel spin;
   control modes of a yaw control system which is arranged to control vehicle yaw, and said plurality of subsystem configuration modes allow different levels of divergence of said vehicle yaw from an expected yaw;
   control modes of a range change transmission and said subsystem configuration modes include a high range mode and a low range mode of said transmission;
   control modes of a powertrain system which includes a powertrain controller and an accelerator or throttle pedal, the subsystem configuration modes providing different levels of responsiveness of the powertrain control means to movement of the accelerator or throttle pedal; and control modes of a transmission system operable in a plurality of transmission ratios and including a transmission controller arranged to monitor at least one parameter of the vehicle and to select the transmission ratios in response, and wherein the subsystem configuration modes include a plurality of transmission configuration modes in which the transmission ratios are selected differently in response to said at least one parameter.

12. A control system according claim 1 wherein the HDC system is configured to apply a retarding torque to the wheels of the vehicle to prevent uncontrolled vehicle acceleration above a HDC target speed as a result of the gravitational forces acting on the vehicle.

13. A vehicle comprising a system according to claim 1.

14. A vehicle according to claim 13 wherein the vehicle is adapted for off-road driving.

15. A method of controlling a vehicle system to operate in an automatic mode selection condition implemented by a controller, when the system is operating in the automatic mode selection condition the method comprising:

receiving a plurality of terrain indicator signals from a plurality of vehicle sensors, said terrain indicator signals representative of a variety of different parameters associated with vehicle motion and status;

automatically determining, in dependence on said terrain indicator signals, a terrain over which the vehicle is travelling; and selecting automatically by said controller an appropriate system operating mode in dependence on the determined terrain, whereby the system assumes operation in the selected mode, the method further comprising activating a Hill Descent Control (HDC) system configured to automatically control the speed of the vehicle to maintain a substantially constant speed when descending an incline, whereby when the HDC system is actively controlling the speed of the vehicle the method comprises suspending automatically changes in the automatically selected system operating mode.

16. A carrier medium carrying computer readable code for controlling a vehicle to carry out the method of claim 15.

* * * * *